United States Patent
Ferdinand et al.

(10) Patent No.: US 12,526,175 B2
(45) Date of Patent: Jan. 13, 2026

(54) PULSE SHAPING-BASED REFERENCE SIGNALS

(71) Applicant: Huawei Technologies Co., Ltd., Shenzhen (CN)

(72) Inventors: Nuwan Suresh Ferdinand, Kanata (CA); Huang Huang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 48 days.

(21) Appl. No.: 18/680,679

(22) Filed: May 31, 2024

(65) Prior Publication Data

US 2024/0396770 A1 Nov. 28, 2024

Related U.S. Application Data

(63) Continuation of application No. PCT/CN2021/134839, filed on Dec. 1, 2021.

(51) Int. Cl.
*H04L 25/03* (2006.01)
*H04L 5/00* (2006.01)
*H04L 27/26* (2006.01)

(52) U.S. Cl.
CPC ...... *H04L 25/03834* (2013.01); *H04L 5/0051* (2013.01); *H04L 5/0091* (2013.01); *H04L 27/26134* (2021.01)

(58) Field of Classification Search
CPC . H04L 5/0053; H04L 5/0048; H04L 27/2613; H04L 5/0051; H04L 5/0094; H04L 5/0023; H04L 27/2614; H04L 27/2636; H04W 72/0446; H04W 72/21; H04W 72/0453; H04W 74/0833; H04W 72/23; H04W 76/27; H04W 56/001; H04W 72/04; H04J 13/0062; H04J 13/0074; H04J 13/20; H04J 13/18; H04J 11/00; H04J 13/00; H04J 13/0059; H04J 1/02; H04J 11/0076

See application file for complete search history.

(56) References Cited

U.S. PATENT DOCUMENTS

| | | | |
|---|---|---|---|
| 11,196,597 B2* | 12/2021 | Yang | H04L 5/10 |
| 2020/0127801 A1 | 4/2020 | Sengupta | |
| 2021/0244545 A1 | 8/2021 | Webb | |
| 2021/0298048 A1* | 9/2021 | Sosnin | H04W 72/046 |

(Continued)

FOREIGN PATENT DOCUMENTS

| | | |
|---|---|---|
| CN | 109792419 A | 5/2019 |
| CN | 111837356 A | 10/2020 |
| WO | 2020167077 A1 | 8/2020 |

*Primary Examiner* — Eva Y Puente
(74) *Attorney, Agent, or Firm* — Slater Matsil, LLP

(57) ABSTRACT

The present disclosure relates to pulse shaping-based reference signals. Signaling indicating information that is associated with pulse shaping and information associated with a target length of a sequence for a reference signal such as a demodulation reference signal (DMRS) is communicated between a first communication device and a second communication device in a wireless communication network. The reference signal is also communicated in the wireless communication network. The reference signal comprises a sequence of the target length to which the pulse shaping has been applied. The sequence comprises a base sequence that is determined based on the pulse shaping.

19 Claims, 16 Drawing Sheets

(56) References Cited

U.S. PATENT DOCUMENTS

| | | | |
|---|---|---|---|
| 2022/0109538 A1* | 4/2022 | Ferdinand | H04L 25/03828 |
| 2022/0173950 A1* | 6/2022 | Sengupta | H04L 27/26035 |
| 2023/0016303 A1* | 1/2023 | Kutz | H04L 27/2614 |
| 2023/0047906 A1 | 2/2023 | Cha et al. | |

* cited by examiner 1310, 1370 or 1372

- Operating System Module
- Transmitting Module
- Receiving Module
- Processing Module
- Machine Learning Module

FIG. 16

PULSE SHAPING-BASED REFERENCE SIGNALS

CROSS-REFERENCE TO RELATED APPLICATIONS

This application is a continuation of International Application No. PCT/CN2021/134839, filed on Dec. 1, 2021, the disclosure of which is hereby incorporated by reference in its entirety.

TECHNICAL FIELD

The present application relates to wireless communications generally, and more specifically to reference signals for use in wireless communications systems.

BACKGROUND

In some wireless communication systems, user equipments (UEs) wirelessly communicate with one or more network devices such as base stations, and potentially with each other. A wireless communication from a UE to a network device is also referred to as an uplink communication. A wireless communication from a network device to a UE is also referred to as a downlink communication. A direct wireless communication between UEs is referred to as a device-to-device communication or a sidelink communication. Network devices may also wirelessly communicate with each other over a backhaul link.

When wireless communication occurs between two communication devices, the communication device that is transmitting a signal may be referred to as a transmitting device, and the communication device that is receiving a signal may be referred to as a receiving device. A single communication device might be both a transmitting device and a receiving device, if that communication device performs both transmission and reception. Examples of communication devices include UEs and network devices. During uplink communication, for example, a UE is the transmitting device and a network device is the receiving device. During downlink communication, the UE is the receiving device and the network device is the transmitting device. One UE is the transmitting device and another UE is the receiving device during sidelink communication, and one network device is the transmitting device and another network device is the receiving device during backhaul communication between the network devices over a backhaul link.

When two communication devices wirelessly communicate with each other, a reference sequence may be transmitted over a wireless channel from the transmitting device to the receiving device. The reference sequence may be used by the receiving device to perform channel estimation for the wireless channel over which the reference sequence was received. Results of the channel estimation may then be used by the receiving device for decoding information, such as control information and/or data, that is received from the transmitting device on that wireless channel.

Pulse shaping may be used in waveforms to reduce peak to average power ratio (PAPR). For example, pulse shaping may be used in single carrier-offset quadrature amplitude modulation (SC-OQAM) or frequency domain spectral shaping with discrete Fourier transform-spread orthogonal frequency division multiplexing (FDSS-DFT-s-OFDM). Typically, pulse shaping is performed in the frequency domain, and a reduction of PAPR is achieved via bandwidth expansion and pulse shaping. This creates a tradeoff between PAPR and spectral efficiency. For example, larger bandwidth expansion, together with larger roll off factor of pulse shape, results in lower PAPR but reduces spectral efficiency.

Reference signal design involves selection or design of not only a reference sequence, but also how the reference sequence is to be signaled, and may be dependent upon the type of waveform that is used for data transmission. For example, in order to retain a benefit of lower PAPR in a data signal, a reference signal such as a demodulation reference signal (DMRS) should match the data signal PAPR.

According to one low-PAPR sequence generation approach, a Zadoff-Chu (ZC) sequence is used with or without FDSS. Although such an approach may have good channel estimation performance, PAPR performance can be poor.

Another low-PAPR sequence generation approach involves generating a $\pi/2$-binary phase shift keying (BPSK) sequence from a pseudo random sequence, then taking the DFT and performing FDSS. PAPR of sequences generated in such an approach is comparable with $\pi/2$ BPSK symbols. However, such sequences have a non-flat frequency response, resulting in poor channel estimation performance, which leads to poor block error rate (BLER). Also, with sequence generation in the time domain, this type of approach does not offer a suitable way to implement code domain multiplexing (CDM) using an orthogonal cover code (OCC) in the frequency domain. Therefore, in new radio (NR), only two antenna ports are supported (only frequency division multiplexing (FDM)), and half of the multiplexing gain is lost.

According to yet another approach, a ZC sequence is cyclically repeated to provide a sequence of a target length, and then FDSS is performed. This may provide a very low PAPR DMRS comparable to $\pi/2$ BPSK FDSS with a particular pulse shape for data transmission, the ability to implement CDM in the frequency domain, and flat frequency response (good autocorrelation). However, BLER may be poor for other data transmission pulse shapes.

SUMMARY

Embodiments disclosed herein relate to design and use of DMRSs that are suitable for different data signal pulse shaping with different roll off factors or bandwidth expansions, and that satisfy both PAPR and BLER performance targets or requirements.

A method according to one aspect of the present disclosure involves communicating signaling between a first communication device and a second communication device in a wireless communication network. The signaling indicates information that is associated with pulse shaping and information associated with a target length of a DMRS sequence. A method may also involve communicating a DMRS in the wireless communication network. The DMRS comprises a DMRS sequence of the target length to which the pulse shaping has been applied, and the DMRS sequence comprises a base sequence that is determined based on the pulse shaping.

Another aspect of the present disclosure relates to an apparatus. The apparatus includes a processor and a non-transitory computer readable storage medium coupled to the processor. The storage medium stores programming for execution by the processor, and the programming includes instructions to communicate signaling between a first communication device and a second communication device in a wireless communication network, and to communicate a DMRS in the wireless communication network. The signaling indicates information that is associated with pulse shaping and information associated with a target length of a DMRS sequence, and the DMRS comprises a DMRS sequence of the target length to which the pulse shaping has been applied, and the DMRS sequence comprises a base sequence that is determined based on the pulse shaping.

A computer program product according to yet another aspect of the present disclosure comprises a non-transitory computer readable medium storing programming. The programming includes instructions to communicate signaling between a first communication device and a second communication device in a wireless communication network. The signaling indicates information that is associated with pulse shaping and information associated with a target length of a DMRS sequence. The programming may also include instructions to communicate a DMRS, which comprises a DMRS sequence of the target length to which the pulse shaping has been applied, in the wireless communication network. The DMRS sequence comprises a base sequence that is determined based on the pulse shaping.

Other aspects and features of embodiments of the present disclosure will become apparent to those ordinarily skilled in the art upon review of the following description.

BRIEF DESCRIPTION OF THE DRAWINGS

For a more complete understanding of the present embodiments, and potential advantages thereof, reference is now made, by way of example, to the following descriptions taken in conjunction with the accompanying drawings.

FIG. 16 illustrates units or modules in a device.

DETAILED DESCRIPTION OF ILLUSTRATIVE EMBODIMENTS

For illustrative purposes, specific example embodiments will now be explained in greater detail below in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Some embodiments of the present disclosure relate in part to DMRS generation that involves finding a root or base sequence, such as a ZC sequence, of a length that minimizes or at least reduces PAPR while maintaining good channel estimation, for different pulse shapes. Different pulse shapes may be associated with, or be defined or characterized as having, different parameters such as different pulse shape types, different bandwidth expansion factors, or different roll off factors. The root or base sequence may be extended to a target length by cyclic repetition, and pulse shaping is applied to the target length sequence to generate a DMRS. A reference signal that is generated in this way has lower PAPR as well good channel estimation performance.

Figure 1:
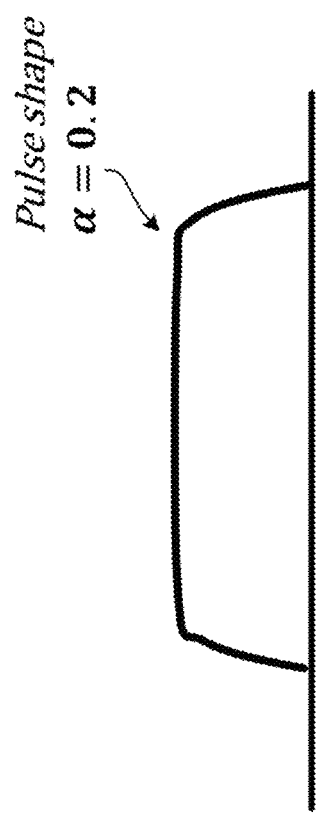
FIG. 1 includes frequency domain plots illustrating different pulse shapes.
Figure 1:
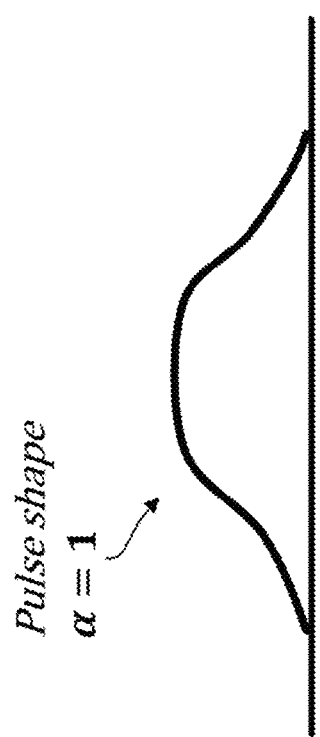

FIG. 1 includes frequency domain plots illustrating different pulse shapes. In FIG. 1, $\alpha$ represents a pulse shaping roll off factor, as an example of a parameter or characteristic of pulse shape. The roll off factor $\alpha$ is correlated with bandwidth expansion, which may be expressed as a bandwidth expansion factor $\beta$. For raised cosine (RC) or root raised cosine (RRC) pulses, $\beta=1+\alpha$. For example, if $\alpha=0.2$ for an RC pulse or an RRC pulse, then the bandwidth expansion factor is $\beta=1.2$, which means that an extra 20% bandwidth is used relative to a rectangular pulse of the same energy. As shown in FIG. 1, a pulse having a lower roll off factor $\alpha$ or a lower bandwidth expansion factor $\beta$ more closely approximates a rectangular pulse and uses less additional bandwidth relative to a rectangular pulse. RC and RRC pulses are examples of different pulse shape types.

Roll off factor $\alpha$ and bandwidth expansion factor $\beta$ are illustrative examples of information associated with pulse shape. Other embodiments may use other types of information associated with pulse shape, in addition to or instead of roll off factor $\alpha$ and/or bandwidth expansion factor $\beta$.

In some embodiments, the length of a root or base sequence from which a reference sequence is to be generated is determined based on pulse shape. For example, based on the roll off factor $\alpha$ or bandwidth expansion factor $\beta$, and thus the pulse shape, a transmitting device may obtain a base sequence length parameter $q^*$, with $0.5 \leq q^* \leq 1$.

Denoting length of the DMRS sequence as $M_{zc}$, the transmitting device may first find the base sequence, illustratively a ZC sequence $x_s(n)$, of length $N_{zc}$ $$x_s(n) = e^{\frac{j\pi sn(n+1)}{N_{zc}}}, \quad 0 \leq n \leq N_{zc} - 1$$

where $N_{zc}$ is the prime number that is closest or nearest to $q^* M_{zc}$. In some cases, $N_{zc}$ may be restricted to be in a range of $0.5 M_{zc} \leq N_{zc} \leq M_{zc}$. Alternatively, $N_{zc}$ may be defined as the largest prime number such that $N_{zc} \leq q^* M_{zc}$ or $N_{zc}$ as the smallest prime number such that $N_{zc} \geq q^* M_{zc}$.

$N_{zc}$ may be expressed as $N_{zc} = \lfloor q^* M_{zc} \rfloor_{prime}$, where $\lfloor \blacksquare \rfloor$ prime denotes a closest or nearest prime number. $N_{zc}$ may be expressed more generally as a function of $q^*$ and $M_{zc}$, for example as $N_{zc} = f(q^*, M_{zc})$. The closest or nearest, largest, and smallest examples above are all examples of a function based upon which base sequence length may be selected or otherwise obtained.

These examples, and others herein, refer to ZC sequences. Embodiments are not restricted only to ZC sequences. In other embodiments, a base sequence may be a pseudo noise (PN) sequence with length $N=N_{zc}$ and may be extended to length $M=M_{zc}$. Another sequence example is a processor-generated or computer-generated base sequence of length $N=N_{zc}$, which may be extended to length $M=M_{zc}$.

The base sequence $x_s(n)$ is cyclically extended to find an $M_{zc}$ length DMRS sequence $$r_s(m)=x_s(m \bmod N_{zc}),$$

where mod denotes modulo operation. After the modulo operation, it is possible to cyclically rotate DMRS sequence.

Next, pulse shaping is applied to this DMRS sequence. The DMRS sequence is pulse shaped with a pulse that has roll off factor $\alpha$. The pulse shape length is $M_{zc}$. Denoting coefficients of the pulse for the pulse shaping that is applied to the DMRS sequence by $f(0), \ldots, f(M_{zc}-1)$, then the generated DMRS can be expressed as $\tilde{r}_s(0), \tilde{r}_s(1), \ldots, \tilde{r}_s(M_{zc})$, with $$\tilde{r}_s(m) = f(m)r_s(m), \ 0 \le m \le M_{Zc} - 1.$$

Figure 2:
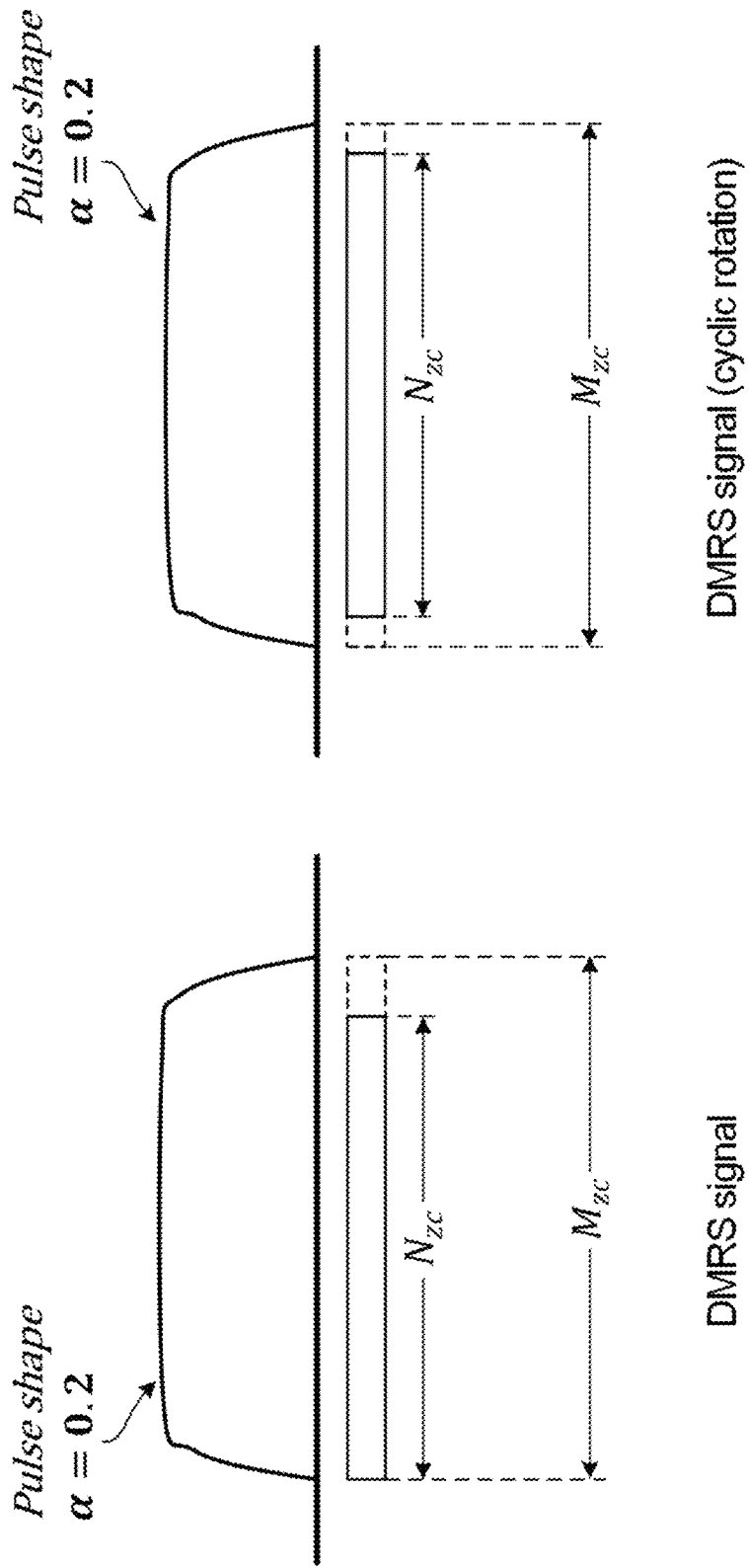
FIG. 2 includes frequency domain plots illustrating example DMRS sequences and pulse shapes according to embodiments.

FIG. 2 includes frequency domain plots illustrating example DMRS sequences and pulse shapes according to embodiments. In the embodiment shown at the left in FIG. 2, the DMRS sequence of target length $M_{zc}$ is generated by cyclically extending a length $N_{zc}$ base sequence. After cyclically extending the base sequence, which is after the modulo operation in the $r_s(m)=x_s(m \bmod N_{zc})$ example above, it is possible to cyclically rotate DMRS sequence, and the example at the right in FIG. 2 illustrates a cyclically rotated target length $M_{zc}$ DMRS sequence.

Figure 3:
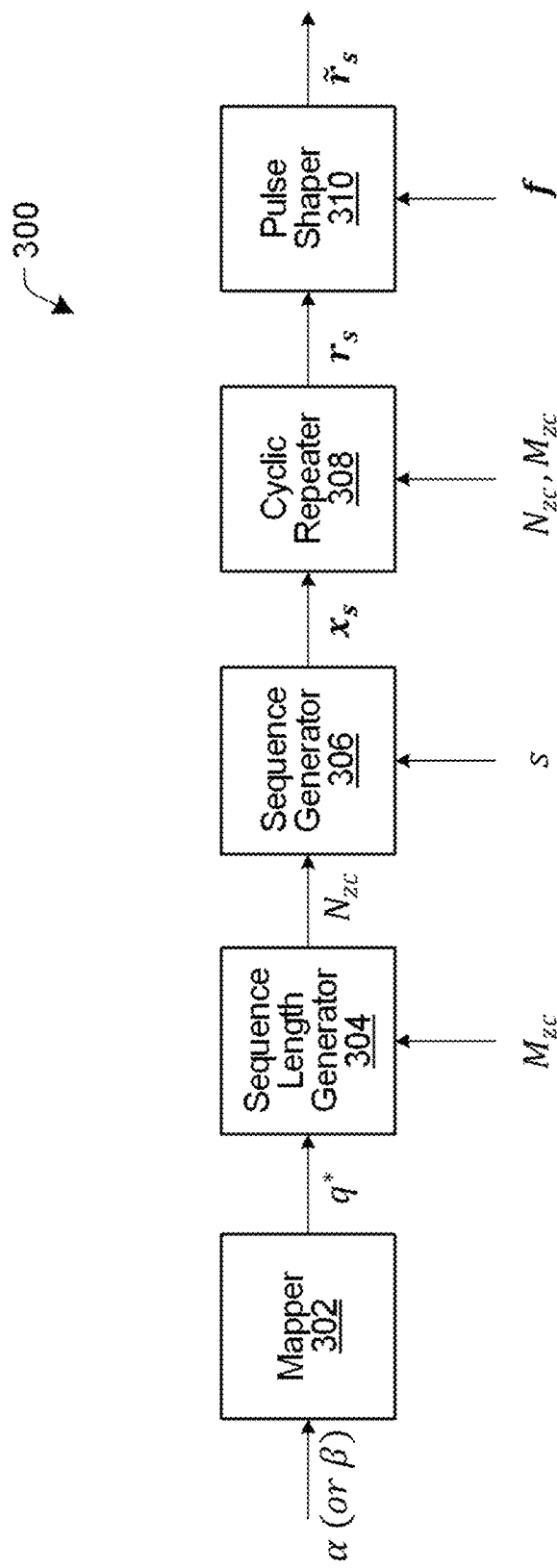
FIG. 3 is a block diagram illustrating an example DMRS generator.

FIG. 3 is a block diagram illustrating an example DMRS generator. The example DMRS generator 300 includes a mapper 302, a sequence length generator 304, a sequence generator 306, a cyclic repeater 308, and a pulse shaper 310, interconnected as shown. Other embodiments may include additional, fewer, or different elements interconnected in a similar or different way.

The elements shown in FIG. 3 may be implemented in any of various ways, such as in hardware, firmware, or one or more components that execute software. The present disclosure is not limited to any specific type of implementation, and implementation details may vary between different devices, for example.

In an embodiment, the example DMRS generator 300 operates according to the DMRS generation example provided above. The mapper 302 is configured, by executing software for example, to obtain $q^*$ based on pulse shape, and in particular based on the roll off factor $\alpha$ or bandwidth expansion factor $\beta$ as shown. In the example DMRS generator 300, $q^*$ is obtained using a mapping, but this is just one embodiment as described in further detail at least below. The sequence length generator 304 is configured, by executing software for example, to determine or otherwise obtain the base sequence length $N_{zc}$ based on $q^*$ and $M_{zc}$, and examples of how the base sequence length $N_{zc}$ may be obtained are provided at least above.

The sequence generator 306 is configured, by executing software for example, to generate the base sequence $x_s(n)$ of length $N_{zc}$, and again an example of a base sequence is provided at least above.

The cyclic repeater 308 is configured, by executing software for example, to cyclically repeat the base sequence $x_s(n)$ in order to cyclically extend the base sequence to length $M_{zc}$, to thereby generate a DMRS sequence $r_s(m)$. An example of a DMRS sequence is also provided at least above. In some embodiments, a cyclically extended sequence is cyclically rotated to generate a DMRS sequence.

The pulse shaper 310 is configured, by executing software for example, to apply pulse shaping to the DMRS sequence with a pulse that has roll off factor $\alpha$. Coefficients of the pulse for the pulse shaping are shown in FIG. 3 as $f$, and the generated DMRS is shown as $\tilde{r}_s$.

Although the pulse shapes shown in FIG. 2 are for a particular roll off factor, embodiments of the present disclosure are not in any way restricted to a particular roll off factor. More generally, there may be a preferred or optimal $N_{zc}$ or $q^*$ (where $N_{zc}=\lfloor q^*M_{zc}\rfloor_{prime}$) for example, that minimizes or at least reduces PAPR while maintaining acceptable BLER for each of multiple values of a. Stated another way, a DMRS sequence may be generated from a root or base sequence of a length that is determined or otherwise obtained based on pulse shaping that is to be applied to a data signal. In this manner, a DMRS sequence is dependent upon transmitter pulse shaping and is matched to the transmitter pulse shaping by varying base sequence length based on the pulse shaping. This type of dependency or relationship between base sequence length and transmitter pulse shaping can help reduce PAPR, and common pulse shape between a DMRS and a data signal can help maintain BLER performance at an acceptable level.

DMRS generation is explained by way of example above. A DMRS may optionally be precoded, in a procedure known as code domain multiplexing (CDM). CDM may be applied before pulse shaping during DMRS generation, or at the same time as pulse shaping, in some embodiments. A CDM procedure may be performed using an orthogonal cover code (OCC) to multiplex antenna ports or UEs in the same resources. After CDM, the precoded DMRS is mapped to subcarriers. An inverse DFT (IDFT) is then taken to convert from frequency domain to time domain, and a CP is added before transmission. DMRS transmission may involve other features or operations, such as multiplexing a DMRS with data after precoding for example.

Figure 4:
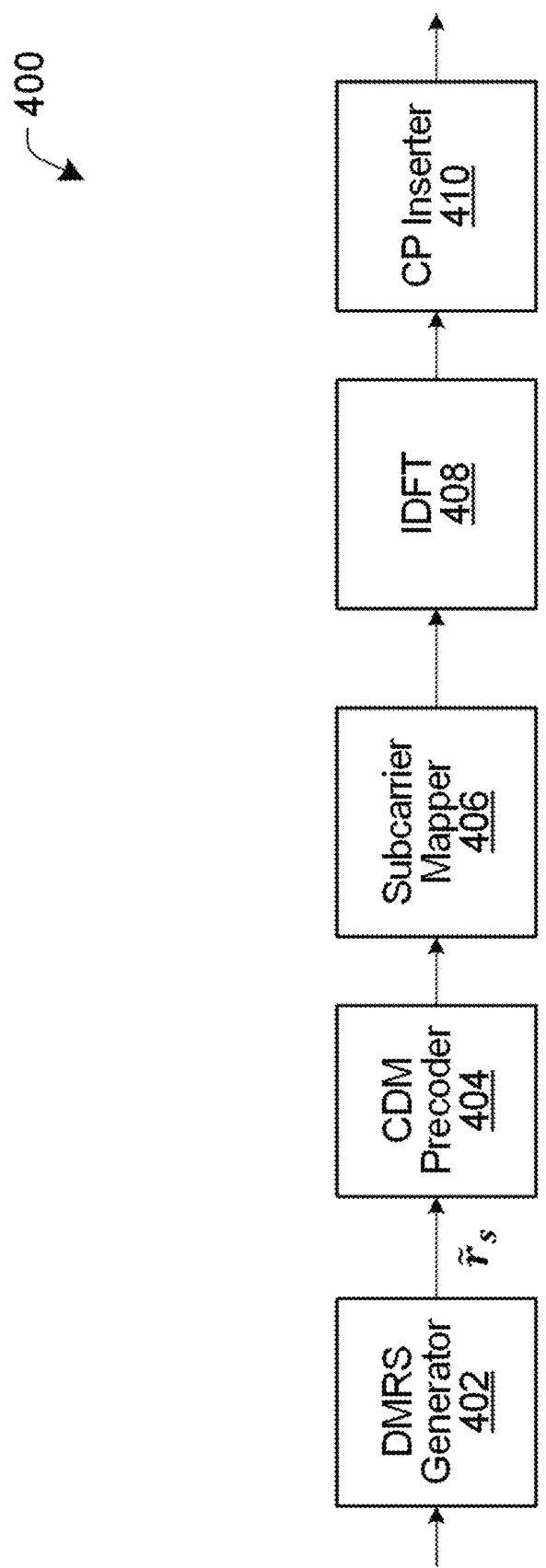
FIG. 4 is a block diagram illustrating an example transmitter.

FIG. 4 is a block diagram illustrating an example transmitter. The example transmitter 400 includes a DMRS generator 402, CDM precoder 404, a subcarrier mapper 406, an IDFT block 408, and a cyclic prefix (CP) inserter 410, interconnected as shown. Other embodiments may include additional, fewer, or different elements interconnected in a similar or different way.

The elements shown in FIG. 4 may be implemented in any of various ways, such as in hardware, firmware, or one or more components that execute software. As noted elsewhere herein, the present disclosure is not limited to any specific type of implementation, and implementation details may vary between different devices, for example.

In an embodiment, the example transmitter 400 operates according to the transmission example provided above. The DMRS generator 402 is configured, by executing software for example, to generate a DMRS. An example of a DMRS generator is shown in FIG. 3. The CDM precoder 404 is configured, by executing software for example, to precode a DMRS in a CDM procedure for example.

The subcarrier mapper 406 is configured, by executing software for example, to map the (optionally precoded) DMRS to subcarriers. A transmitter may include a multiplexer to multiplex a DMRS with data after precoding and before subcarrier mapping, for example.

The IDFT block 408 is configured, by executing software for example, to convert from frequency domain to time domain by taking an IDFT. The CP inserter 410 is configured, by executing software for example, to insert a CP prior to transmission.

Figure 5:
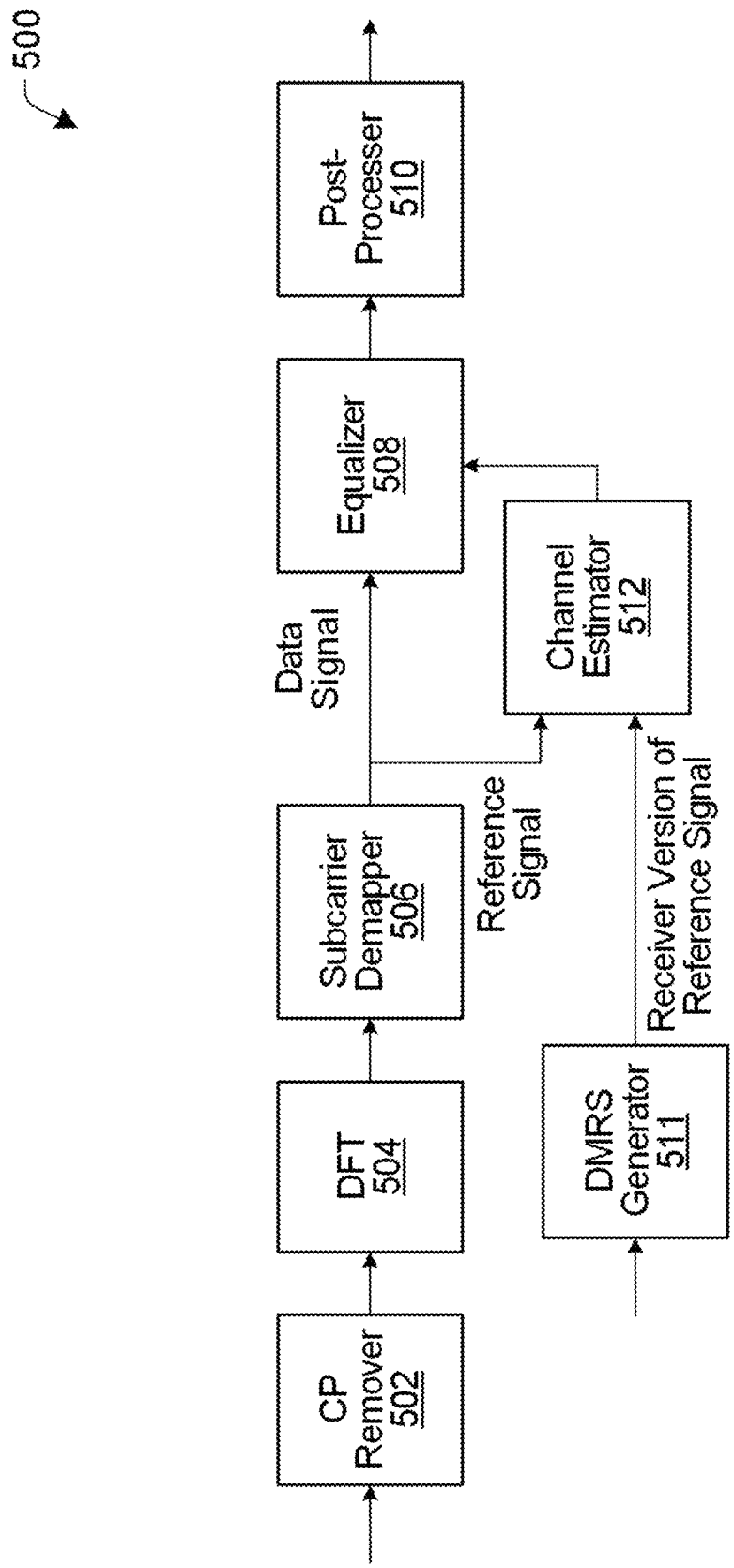
FIG. 5 is a block diagram illustrating an example receiver.

FIG. 5 is a block diagram illustrating an example receiver. The example receiver 500 includes a CP remover 502, a DFT block 504, a subcarrier demapper 506, an equalizer 508, a post-processor 510, a DMRS generator 511, and a channel estimator 512, interconnected as shown. Other embodiments may include additional, fewer, or different elements interconnected in a similar or different way.

The elements shown in FIG. 5 may be implemented in any of various ways, such as in hardware, firmware, or one or more components that execute software. As noted elsewhere herein, the present disclosure is not limited to any specific type of implementation, and implementation details may vary between different devices, for example.

Receiver operations may include CP removal, conversion to frequency domain by a DFT, subcarrier demapping and demultiplexing a data signal and a reference signal, channel estimation based on a received reference signal and a locally generated receiver version of the reference signal, equalization of the data signal based on channel estimates, and any of various types of post-processing, such as further processing based on transmitter precoding for example.

In the example receiver 500, the CP remover 502 is configured, by executing software for example, to remove the cyclic prefix; the DFT block 504 is configured, by executing software for example, to perform a DFT to convert a received time domain signal to frequency domain; the subcarrier demapper 506 is configured, by executing software for example, to perform subcarrier demapping; the equalizer 508 is configured, by executing software for example, to equalize a data portion of the output of the subcarrier demapper 506; the channel estimator 512 is configured, by executing software for example, to process a reference signal portion of the output of the subcarrier demapper 506 and a receiver version of the reference signal generated by the DMRS generator 511 to produce channel estimates that are provided to the equalizer 508; and the post-processor 510 is configured, by executing software for example, to process the output of the equalizer. The channel estimator 512 receives a receiver version of the reference signal from the DMRS generator 511 for channel estimation in the example receiver 500. More generally, the channel estimator 512 receives, determines, or otherwise obtains the same base sequence or DMRS as a transmitter and then uses it to perform channel estimation. The post-processor 510 may take into account any precoding performed at a transmitter, for example.

Figure 6:
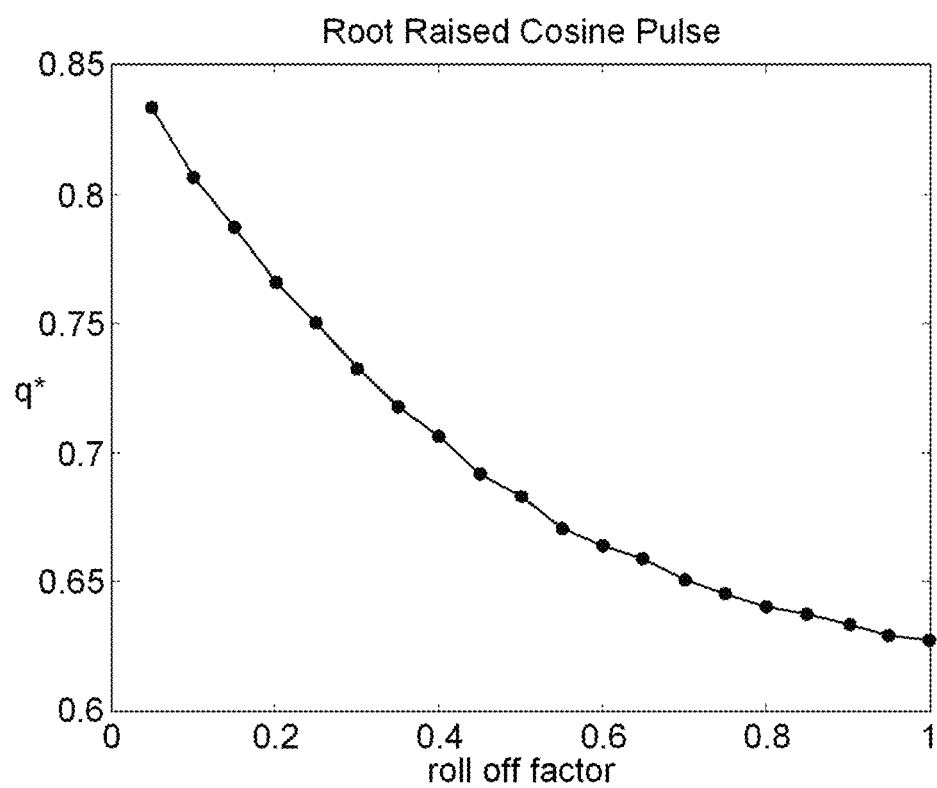
FIG. 6 is a plot of a base sequence length parameter $q^*$ versus roll off factor for a root raised cosine pulse.

In some embodiments, preferred or optimal values of q* may be specified for a range of roll off factors that are of interest. FIG. 6 is a plot of q* versus roll off factor for a root raised cosine pulse, and illustrates preferred or optimal values of q* according to an embodiment.

A mapping is referenced at least above in the context of FIG. 3, for example, and could be based on a table or other record of preferred or optimal values of q* stored in a memory or otherwise accessible for obtaining an value of q*. An example mapping between roll off factor and q*, at 0.1 roll off factor resolution, is provided in Table 1 below.

TABLE 1

Example mapping between roll off factor and q* for a root raised cosine pulse

| α (roll off factor) | q* |
|---|---|
| 0.1 | 0.80 |
| 0.2 | 0.77 |
| 0.3 | 0.73 |
| 0.4 | 0.70 |
| 0.5 | 0.68 |
| 0.6 | 0.66 |
| 0.7 | 0.65 |
| 0.8 | 0.64 |
| 0.9 | 0.63 |
| 1 | 0.62 |

Other resolutions of roll off factor, for mapping more or fewer values of q*, may be used in other embodiments. The illustrated values of q* are also examples, and embodiments may use q* values with greater or less precision (more or fewer decimal places). In general, more or fewer values, at the same or different resolutions, with the same or different precision, may be mapped or otherwise specified in other embodiments.

Figure 7:
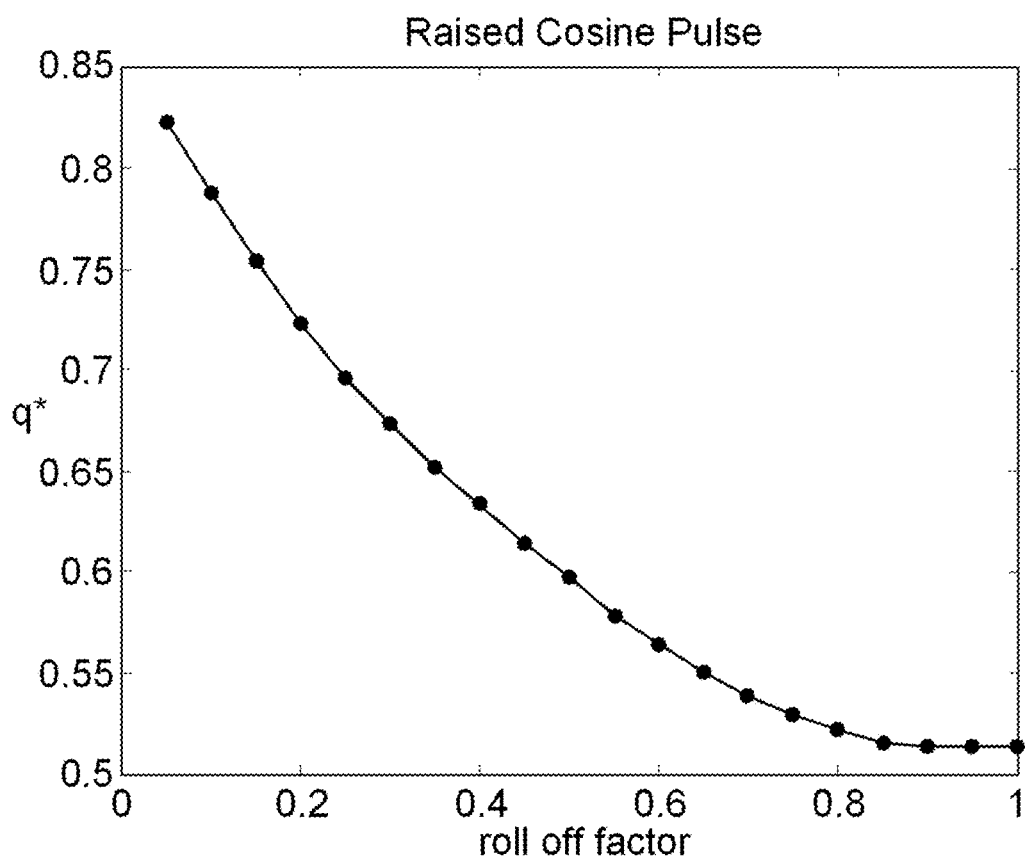
FIG. 7 is a plot of $q^*$ versus roll off factor for a raised cosine pulse.

FIG. 7 is a plot of a base sequence length parameter q* versus roll off factor for a raised cosine pulse, and illustrates another example of preferred or optimal values of q* according to an embodiment.

Another example mapping between roll off factor and q*, at 0.1 roll off factor resolution, is provided in Table 2 below.

TABLE 2

Example mapping between roll off factor and q* for a raised cosine pulse

| α (roll off factor) | q* |
|---|---|
| 0.1 | 0.79 |
| 0.2 | 0.72 |
| 0.3 | 0.67 |
| 0.4 | 0.63 |
| 0.5 | 0.6 |
| 0.6 | 0.56 |
| 0.7 | 0.54 |
| 0.8 | 0.52 |
| 0.9 | 0.51 |
| 1 | 0.51 |

As noted above for Table 1, Table 2 is an example and more or fewer values, at the same or different resolutions, with the same or different precision, may be mapped or otherwise specified in other embodiments.

It should also be noted that RRC and RC pulses are non-limiting examples, and other pulse shapes may be used in other embodiments.

One potential benefit of mapping or specifying a finite set of q* values is that such an approach may reduce or limit overhead that might otherwise be involved in signaling or otherwise specifying a larger set of values.

Figure 8:
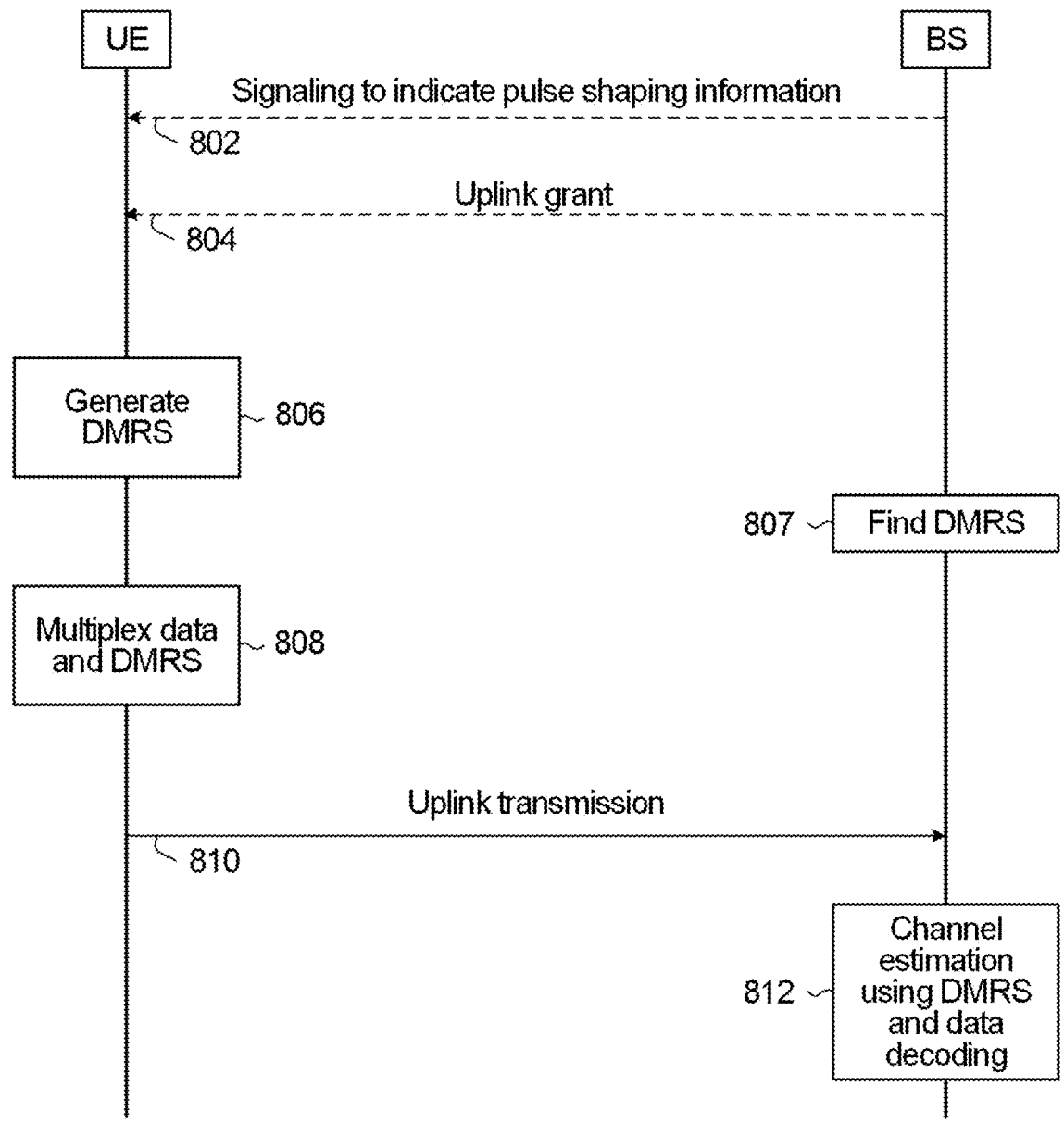
FIG. 8 is a signal flow diagram for uplink communications according to an embodiment.

FIG. 8 is a signal flow diagram for uplink communications according to an embodiment. Features illustrated in FIG. 8 include communicating signaling at 802, which may be higher layer signaling for example, between a base station (BS) and a UE. This communicating at 802 involves transmitting the signaling by the BS to the UE and receiving the signaling by the UE from the BS. Radio resource control (RRC) signaling is one example of higher layer signaling that may be used to indicate information associated with pulse shaping, and possibly other information related to reference signal configuration such as information associated with a target length of a DMRS sequence. The signaling indicates information associated with pulse shaping and information associated with a target length of a DMRS sequence in some embodiments. Examples of such information are provided elsewhere herein. An uplink grant is also communicated between the BS and the UE at 804, by the BS transmitting grant signaling to the UE and the UE receiving the grant signaling from the BS. Not all embodiments are necessarily grant-based, and therefore an uplink grant need not necessarily be communicated at 804.

Generating a DMRS by the UE is shown at 806, and DMRS generation is as disclosed elsewhere herein. At 808, FIG. 8 illustrates multiplexing data and the generated DMRS by the UE. An uplink transmission from the UE to the BS is shown at 810, and represents one example of how a DMRS may be communicated in a wireless communication network. In this example, communicating the DMRS involves transmitting the DMRS by the UE to the BS and receiving the DMRS by the BS from the UE. At 812, FIG. 8 illustrates the BS performing channel estimation using the DMRS, and decoding data based on the results of the channel estimation.

At a receiving device or receiver that receives a DMRS, such as the BS in FIG. 8, channel estimation may use a locally generated receiver version of the same DMRS sequence as the UE for channel estimation. Generating a DMRS by the BS is shown at 807 as "Find DMRS", only to differentiate DMRS generation by a transmitting device for transmission (at 806) from receiver DMRS generation (at 807) for local use at a receiving device. A DMRS is generated at 807 in the same way as at 806, as disclosed elsewhere herein.

Figure 9:
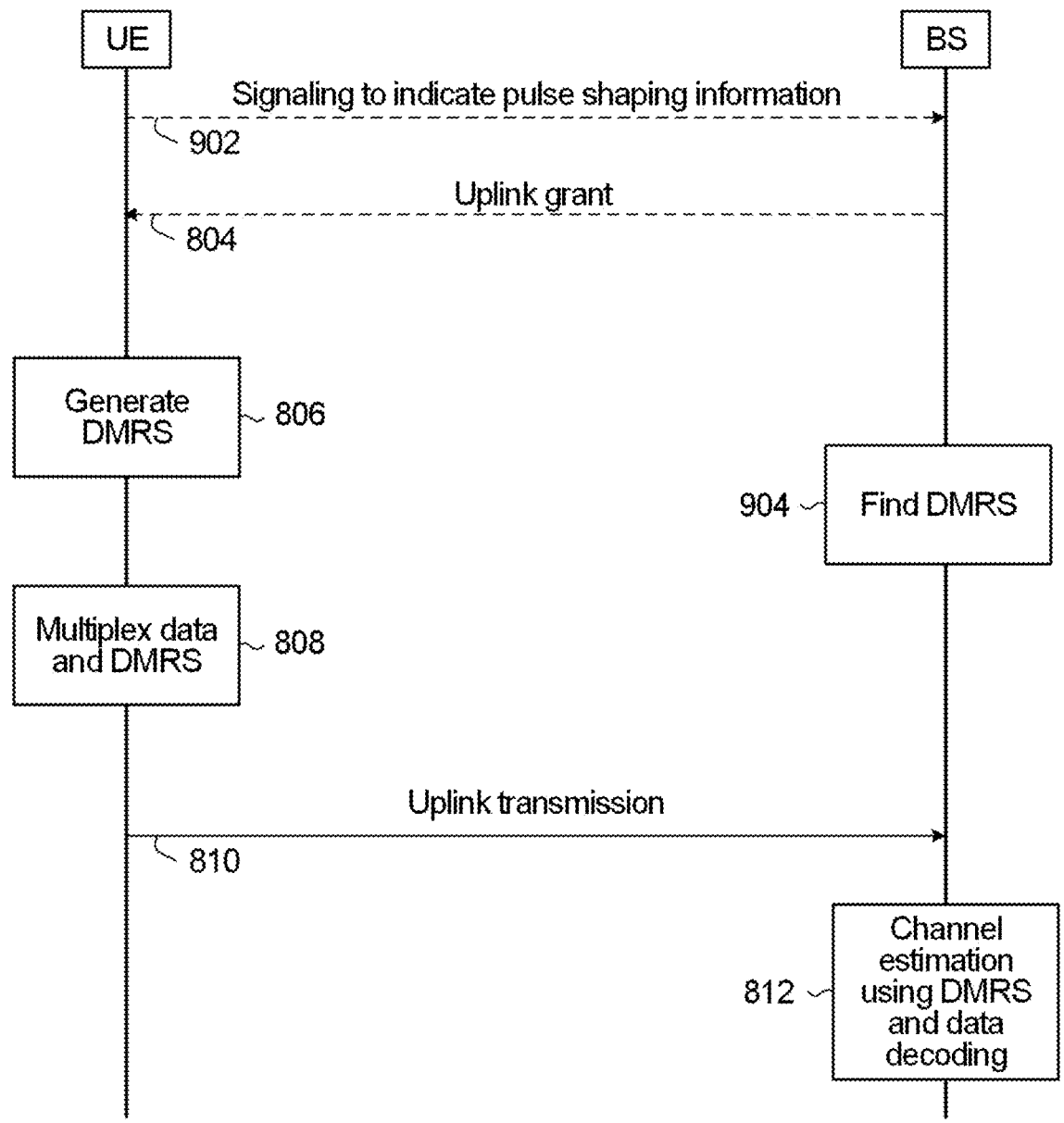
FIG. 9 is a signal flow diagram for uplink communications according to another embodiment.

FIG. 9 is a signal flow diagram for uplink communications according to another embodiment. The example in FIG. 9 involves communicating signaling that indicates information associated with pulse shaping, and possibly other information such as information associated with a target length of a DMRS sequence, but as shown at 902 this communicating involves transmitting the signaling by the UE to the BS and receiving the signaling by the BS from the UE. In some embodiments, uplink communications may involve the UE selecting or otherwise obtaining pulse shaping information, and possibly other information such as information associated with a target length of a DMRS sequence, and transmitting signaling that indicates the information to the BS. The BS may then receive the signaling and generate the same DMRS sequence as the UE for channel estimation. Generating a DMRS by the BS is shown at 904 as "Find DMRS", as in FIG. 8, only to differentiate DMRS generation by a transmitting device for transmission (at 806) from DMRS generation for local use at a receiving device (at 812). A DMRS is generated at 904 in the same way as at 806, as disclosed elsewhere herein.

As an example, given a bandwidth expansion factor associated with pulse shaping, the UE can select or otherwise obtain q* to generate a DMRS at 806, and transmit signaling at 902 to indicate q* to the BS so that the BS can generate the same DMRS for channel estimation at 904 after receiving the signaling at 902. This type of scenario may be useful, for example, when a UE selects, is configured with, or otherwise obtains its own pulse shape for pulse shaping and obtains a preferred or optimal q* for that particular pulse shape. In this case, q* may be signaled to the BS, but the pulse shape may remain transparent to the BS in that the BS need not be explicitly informed of the pulse shape.

The example shown in FIG. 9, apart from the features illustrated at 902, is consistent with FIG. 8.

Figure 10:
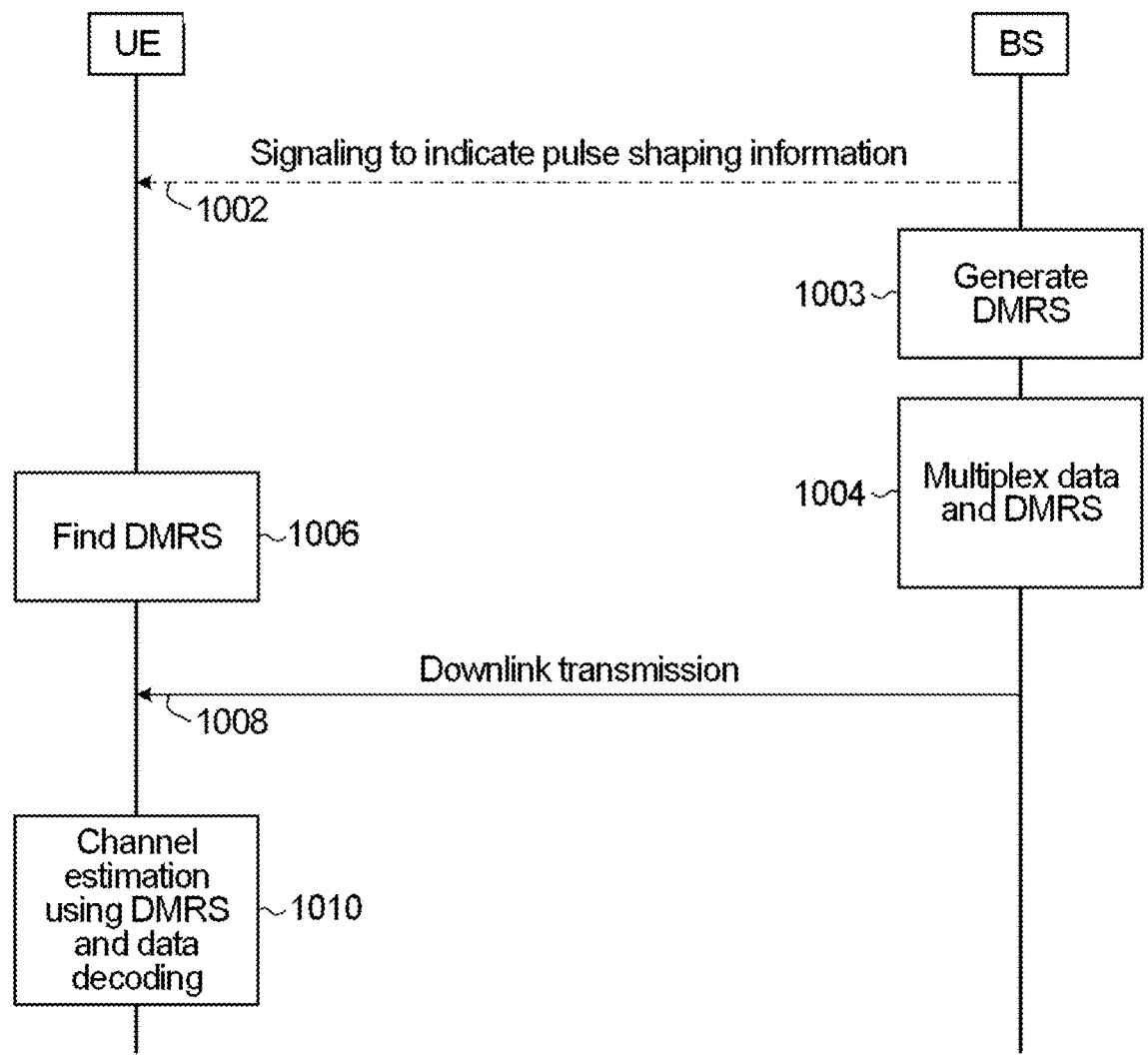
FIG. 10 is a signal flow diagram for downlink communications according to an embodiment.

FIG. 10 is a signal flow diagram for downlink communications according to an embodiment. Features illustrated in FIG. 10 include communicating signaling at 1002, between a BS and a UE. As in FIG. 8, this communicating at 1002 involves transmitting the signaling by the BS to the UE and receiving the signaling by the UE from the BS, and the signaling indicates information associated with pulse shaping and possibly other information such as information associated with a target length of a DMRS sequence.

DMRS generation at the BS is shown at 1003. Generating a DMRS by the UE is shown at 1006 as "Find DMRS", but involves DMRS generation as disclosed elsewhere herein. As in FIG. 9, the labeling at 1006 is intended only to differentiate DMRS generation by a transmitting device for transmission (at the BS) from DMRS generation for local use at a receiving device (at 1006). At 1004, FIG. 10 illustrates multiplexing data and the generated DMRS by the BS. A downlink transmission from the BS to the UE is shown at 1008, and represents another example of how a DMRS may be communicated in a wireless communication network. In this example, communicating the DMRS involves transmitting the DMRS by the BS to the UE and receiving the DMRS by the UE from the BS. At 1010, FIG. 10 illustrates the UE performing channel estimation using the DMRS, and decoding data based on the results of the channel estimation.

For downlink communications, it is likely that pulse shaping will be selected by the BS. However, it is possible that pulse shaping information previously transmitted by the UE to the BS and received by the BS from the UE may be used by the UE in generating a DMRS for downlink communications. Therefore, communicating signaling that indicates pulse shaping information, and possibly other information such as information associated with a target length of a DMRS sequence, may involve communicating signaling from a UE to a BS, even in the case of downlink communications.

Figure 11:
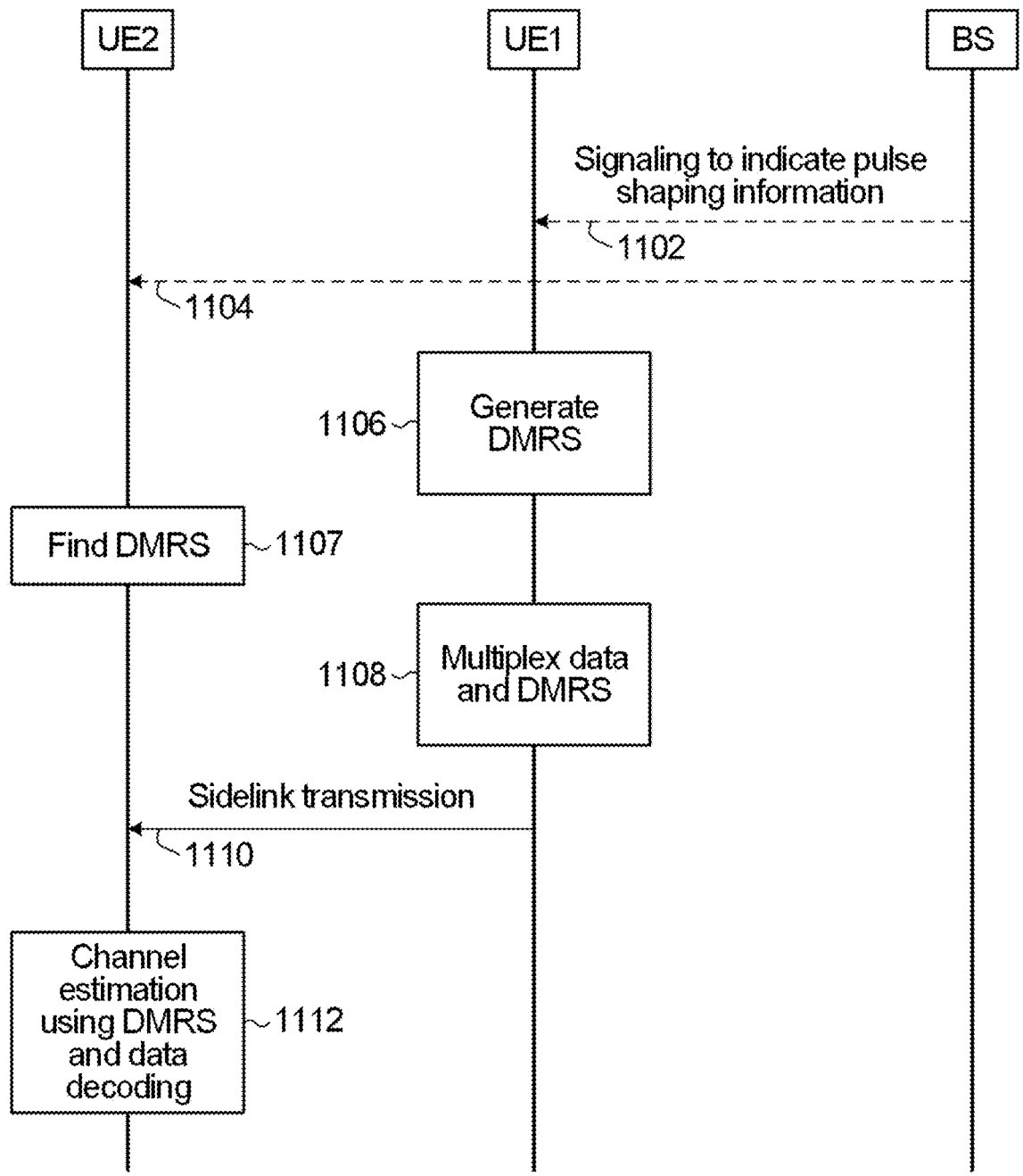
FIG. 11 is a signal flow diagram for sidelink communications according to an embodiment.

FIG. 11 is a signal flow diagram for sidelink communications according to an embodiment. Sidelink DMRS transmission may occur between two UEs that may still be controlled by a BS. Features illustrated in FIG. 11 include communicating signaling at 1102, 1104, between a BS and a first UE, UE1, and between the BS and a second UE, UE2. The communicating at 1102 involves transmitting the signaling by the BS to UE1 and receiving the signaling by UE1 from the BS. The communicating at 1104 involves transmitting the signaling by the BS to UE2 and receiving the signaling by UE2 from the BS. The signaling indicates information associated with pulse shaping that is to be applied by UE1 in this example, and may include other information such as information associated with a target length of a DMRS sequence.

Generating a DMRS by UE1 and finding a DMRS by UE2 are shown at 1106, 1107, and involve DMRS generation as disclosed elsewhere herein. At 1108, FIG. 11 illustrates multiplexing data and the generated DMRS by UE1. UE2 may also generate a DMRS at 1107 in the same way as UE1, as discussed in the context of the "Find DMRS" operations referenced in FIGS. 8 to 10, for example. A sidelink transmission from UE1 to UE2 is shown at 1110, and represents one example of how a DMRS may be communicated in a wireless communication network. In this example, communicating the DMRS involves transmitting the DMRS by UE1 to UE2 and receiving the DMRS by UE2 from UE1. At 1112, FIG. 11 illustrates UE2 performing channel estimation using the DMRS, and decoding data based on the results of the channel estimation.

Figure 12:
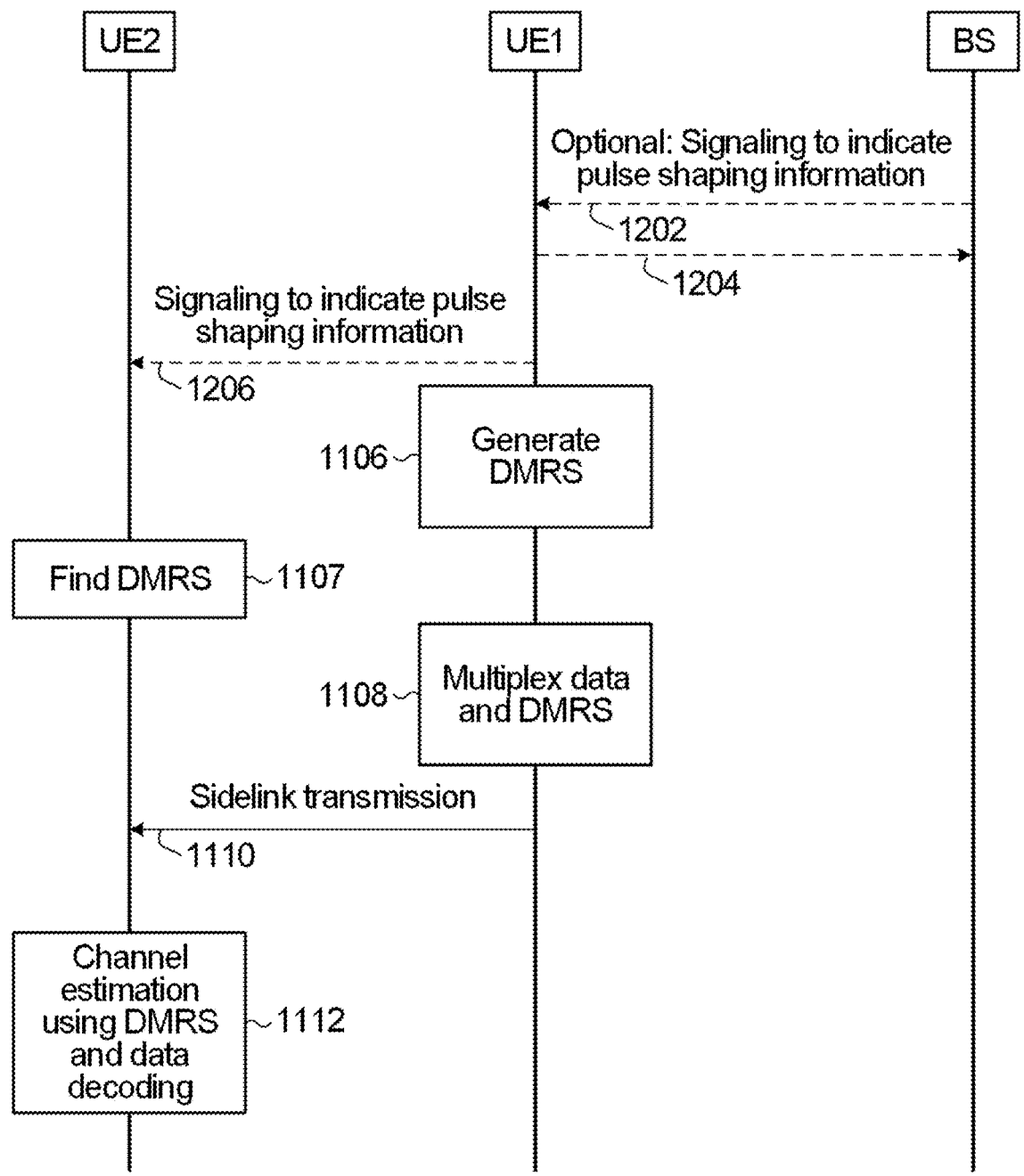
FIG. 12 is a signal flow diagram for sidelink communications according to another embodiment.

In another embodiment for sidelink communications, a transmitter UE such as UE1 configures one or more parameters for DMRS transmission and sends the parameter(s) to a receiving UE such as UE2, via sidelink control information (SCI) or PC5 (sidelink RRC). FIG. 12 is a signal flow diagram for sidelink communications according to another embodiment, which involves communicating signaling between UE1 and UE2.

The example in FIG. 12 involves communicating signaling that indicates information associated with pulse shaping, and possibly other information such as information associated with a target length of a DMRS sequence, but as shown at 1206 this communicating involves transmitting the signaling by UE1 to UE2 and receiving the signaling by UE2 from UE1. Sidelink communications may involve a transmitting UE (UE1 in FIG. 12) selecting or otherwise obtaining pulse shaping information, and possibly other information such as information associated with a target length of a DMRS sequence, and transmitting signaling that indicates the information to a receiving UE (UE2 in FIG. 12). The receiving UE (UE2) may then receive the signaling and generate the same DMRS sequence as the transmitting UE (UE1) for channel estimation, as described at least above with reference to FIG. 11.

Embodiments that involve communicating signaling between UEs as shown by way of example in FIG. 12 may or may not also involve communicating signaling between a BS and a UE. Optional features are shown in FIG. 12 at 1202, 1204. Some embodiments may involve communicating signaling at 1202, between the BS and UE1, when pulse shaping that is to be applied by UE1 is ultimately determined or controlled by the BS. In embodiments in which UE1 selects or otherwise obtains its pulse shaping, signaling need not be communicated at 1202. Communicating signaling as shown at 1204 is also optional. For sidelink communications, pulse shaping and DMRS-related operations may remain transparent to the BS, and the BS need not be informed of pulse shaping information. These features may also or instead apply to target DMRS sequence length and information associated with a target length of a DMRS sequence.

FIGS. 8 to 12 are illustrative of various embodiments. More generally, a method consistent with the present disclosure may involve communicating signaling between a first communication device and a second communication device in a wireless communication network. The signaling indicates information associated with pulse shaping, and information associated with a target length of a DMRS sequence in some embodiments.

Communicating may involve transmitting the signaling, receiving the signaling, or both. For example, FIGS. 8 to 12 illustrate embodiments in which communicating signaling involves the following, any one or more of which may be provided or supported by different types of communication devices such as UEs or base stations:

receiving, by a UE, signaling from a BS or another UE, as shown by way of example at 802, 1002, 1102, 1104, 1202, 1206;

receiving, by a BS, signaling from a UE, as shown by way of example at 902, 1204;

transmitting, by a UE, signaling to a BS and/or to another UE, as shown by way of example at 902, 1204, 1206; and/or transmitting, by a BS, signaling to one or more UEs, as shown by way of example at 802, 1002, 1102, 1104, 1202, 1206.

These examples illustrate that communicating signaling may involve transmitting the signaling by any of various types of first communication device such as a UE or a base station or other network device, to any of various types of second communication device such as a UE or a base station or other network device. Communicating signaling may also or instead involve receiving the signaling at any of various types of first communication device such as a UE or a base station or other network device, from any of various types of second communication device such as a UE or a base station or other network device.

A method may also involve communicating a DMRS in a wireless communication network. The DMRS comprises a DMRS sequence of target length to which the pulse shaping has been applied. The DMRS sequence comprises a base sequence that is determined based on the pulse shaping.

Similar to communicating signaling, communicating a DMRS may involve may involve transmitting the DMRS by any of various types of communication device such as a UE or a base station or other network device, to any of various types of communication device such as a UE or a base station or other network device. Communicating a DMRS may also or instead involve receiving the DMRS at any of various types of communication device such as a UE or a base station or other network device, from any of various types of communication device such as a UE or a base station or other network device. Examples of communicating a DMRS, including transmitting and receiving examples, are shown in FIGS. 8 to 12 at 810, 1008, 1110.

A receiver or intended receiver (or receiving device) of a DMRS may transmit or receive signaling before a DMRS is received. In FIG. 8, for example, the BS is the intended receiver of the DMRS and transmits signaling at 802 before receiving the DMRS at 810. In FIG. 9, the BS is the intended receiver of the DMRS and receives signaling at 902 before receiving the DMRS at 810. In FIG. 10, the UE is the intended receiver of the DMRS and receives signaling at 1002 before receiving the DMRS at 1008. In FIGS. 11 and 12, UE2 is the intended receiver of a DMRS and receives signaling at 1104 (from the BS) or 1206 (from UE1) before receiving a DMRS at 1110.

Similarly, a transmitter or intended transmitter (or transmitting device) of a DMRS may transmit or receive signaling before a DMRS is transmitted. In FIG. 8, for example, the UE is the transmitter of the DMRS and receives signaling at 802 before transmitting the DMRS at 810. The UE is also the transmitter of the DMRS in FIG. 9, but transmits signaling at 902 before transmitting the DMRS at 910. In FIG. 10, the BS is the transmitter of the DMRS and transmits signaling at 1002 before transmitting the DMRS at 1008. In FIGS. 11 and 12, UE1 is the transmitter of a DMRS and may receive signaling at 1102 or 1202 (from the BS), or transmit signaling at 1204 (to the BS) and/or 1206 (to UE2) before transmitting a DMRS at 1110.

In some embodiments, signaling and a DMRS (possibly multiplexed or otherwise combined with data) are communicated between a transmitter and an intended receiver of the DMRS, as in FIGS. 8-10 and between UE1 and UE2 in FIG. 12. Thus, in the context of communicating signaling between a first communication device and a second communication device, in such embodiments communicating a DMRS involves communicating the DMRS between the first communication device and the second communication device.

Signaling and a DMRS need not necessarily be communicated between the same devices. Consider FIG. 11 as an example. Signaling is communicated between the BS and UE1 at 1102 and between the BS and UE2 at 1104, but the DMRS is communicated between UE1 and UE2. This is illustrative of embodiments in which signaling and a DMRS are not communicated between the same devices. In the context of communicating signaling between a first communication device and a second communication device, in such embodiments communicating a DMRS may involve communicating the DMRS between the first communication device (or the second communication device) and a third communication device in the wireless communication network.

These are all illustrative of examples of communicating signaling and communicating a DMRS.

Turning to the signaling, as described at least above the signaling indicates information associated with pulse shaping. The information associated with pulse shaping may include, for example, any one or more of: a pulse shape type, a roll off factor $\alpha$, a bandwidth expansion, a bandwidth expansion factor $\beta$, a base sequence length parameter that is based on the pulse shaping, and a length of the base sequence.

In some embodiments, the pulse shape type is RC or RRC, the pulse shaping is based on RC or RRC pulses, and $\beta=1+\alpha$.

A length N of a base sequence may be a prime number that is closest to $q^*M$, a largest prime number such that $N \leq q^*M$, or a smallest prime number such that $N \geq q^*M$, where $q^*$ is a base sequence length parameter that is based on the pulse shaping and M is a target length of a DMRS sequence for the DMRS. In some embodiments, $q^*$ is within a range $0.5 \leq q^* \leq 1$.

The base sequence may be or include a ZC sequence $x_s(n)$ of length $N=N_{zc}$ $$x_s(n) = e^{\frac{j\pi s n(n+1)}{N_{zc}}}, \quad 0 \leq n \leq N_{zc} - 1.$$

In some embodiments, the information associated with pulse shaping is or includes $q^*$. Signaling may indicate $q^*$, but may also or instead indicate other information that is associated with pulse shaping.

If signaling indicates $q^*$, then $q^*$ is obtained from the received signaling. In other embodiments, $q^*$ may be obtained based on the information that is associated with pulse shaping and indicated in the signaling. For example, in embodiments in which communicating the DMRS involves transmitting the DMRS, a method may involve an operation of obtaining $q^*$ based on the information associated with pulse shaping. In embodiments in which communicating the DMRS involves receiving the DMRS, a method may involve generating a local or receiver version of the DMRS for channel estimation, and the generating may involve an operation of obtaining $q^*$ based on the information associated with pulse shaping. Obtaining $q^*$ may involve a mapping between the information associated with pulse shaping (indicated in the signaling) and preferred or optimal values of $q^*$. These values of $q^*$ may be mapped to the information associated with pulse shaping in a table or other record stored in a memory or otherwise accessible for obtaining an value of $q^*$. Mappings between roll off factor and $q^*$ are provided by way of example herein. A table or other record may include multiple preferred or optimal values of $q^*$, for a plurality of different pulse shaping options, with a respective value of $q^*$ for each different pulse shaping option. A value of $q^*$ may be chosen, selected, or otherwise obtained based on the information associated with pulse shaping (indicated in the signaling).

Although some embodiments are disclosed herein with reference to $q^*$, $q^*$ is one example of a base sequence length parameter. Other base sequence length parameters are also possible. As another example, a base sequence length parameter K may be, but need not necessarily be, a prime number that is based on the pulse shaping. Then, DMRS generation may involve determining or otherwise obtaining as a base sequence length N a prime number that is closest to K, a largest prime number such that $N \leq K$, or a smallest prime number such that $N \geq K$, where $q^*$ is a base sequence length parameter and M is a target length of a DMRS sequence for the DMRS.

Signaling may be or include K, or other information associated with K and from which K can be determined or otherwise obtained, such as a ratio K/M.

Features disclosed herein regarding $q^*$ or $q^*M$ may also or instead apply to other base sequence length parameters such as K.

Not all embodiments necessarily involve a base sequence length parameter. For example, signaling may indicate base sequence length N, in which case base sequence length can be obtained from received signaling.

A DMRS may include a base sequence extended to a target length of a DMRS sequence for the DMRS by cyclic repetition. Target DMRS sequence length may be obtained from received signaling, in embodiments in which signaling indicates information associated with the target length, such as the target length or information from which the target length can be determined or otherwise obtained.

For a DMRS transmitter, communicating the DMRS involves transmitting the DMRS in some embodiments, and a method may involve extending the base sequence to the target length of the DMRS sequence by cyclic repetition. For a DMRS receiver or intended receiver, communicating the DMRS involves receiving the DMRS, and a method may include generating a receiver version of the DMRS for channel estimation. The generating may involve extending the base sequence to the target length of the DMRS sequence by cyclic repetition to generate the receiver version of the DMRS sequence.

As an example of extending a sequence, a DMRS may include the base sequence extended to target length $M=M_{zc}$ of the DMRS sequence by cyclic repetition to generate the DMRS sequence $$r_s(m)=x_s(m \bmod N_{zc}).$$

For a DMRS transmitter, in which communicating the DMRS involves transmitting the DMRS, a method may involve extending the base sequence to the target length to the target length $M=M_{zc}$ of the DMRS sequence by cyclic repetition to generate this DMRS sequence. For a DMRS receiver or intended receiver, communicating the DMRS involves receiving the DMRS, and generating the receiver version of the DMRS for channel estimation may involve extending the base sequence to the target length $M=M_{zc}$ of the DMRS sequence by cyclic repetition to generate a receiver version of the DMRS sequence $$r_s(m)=x_s(m \bmod N_{zc}).$$

In some embodiments, the DMRS is or includes a pulse-shaped DMRS sequence. The pulse-shaped DMRS sequence may be or include the DMRS sequence, to which the pulse shaping is applied. For a DMRS transmitter, a method may involve applying the pulse shaping to the DMRS sequence to generate the pulse-shaped DMRS sequence. For a DMRS receiver or intended receiver, the receiver version of the DMRS may be or include a receiver version of the pulse-shaped DMRS sequence, and generating the receiver version of the pulse-shaped DMRS sequence may involve applying the pulse shaping to the receiver version of the DMRS sequence.

In an embodiment, pulse shape length of a pulse for the pulse shaping may be $M_{zc}$, coefficients of the pulse for the pulse shaping are $f(0), \ldots, f(M_{zc}-1)$, and the DMRS is $\tilde{r}_s(0), \tilde{r}_s(1), \ldots, \tilde{r}_s(M_{zc})$, with $$\tilde{r}_s(m) = f(m)r_s(m), \quad 0 \le m \le M_{Zc} - 1.$$

For a DMRS transmitter a method may involve applying such pulse shaping to the DMRS sequence to generate the pulse-shaped DMRS sequence, and for a DMRS receiver or intended receiver generating a receiver version of the DMRS for channel estimation may involve applying such pulse shaping to the receiver version of the DMRS sequence to generate the receiver version of the pulse-shaped DMRS sequence.

In some embodiments, communicating the DMRS may involve communicating, by transmitting or receiving, a precoded pulse-shaped DMRS sequence. The precoded pulse-shaped DMRS sequence may be or include the pulse-shaped DMRS sequence to which precoding is applied. The precoding may involve CDM for example.

Other features related to communicating a DMRS may include, for example, communicating frequency domain components of the DMRS mapped to subcarriers and converted to time domain, and/or communicating the DMRS with a cyclic prefix inserted.

Any one or more of precoding, subcarrier mapping, converting from frequency domain to time domain, and cyclic prefix insertion may be provided or supported at a DMRS transmitter, and any one or more of counterpart or inverse operations including cyclic prefix removal, converting from time domain to frequency domain, subcarrier demapping, and decoding may be provided or supported at a DMRS receiver.

These method examples are illustrative and non-limiting embodiments, and other embodiments may include additional or different features disclosed herein.

Figure 13:
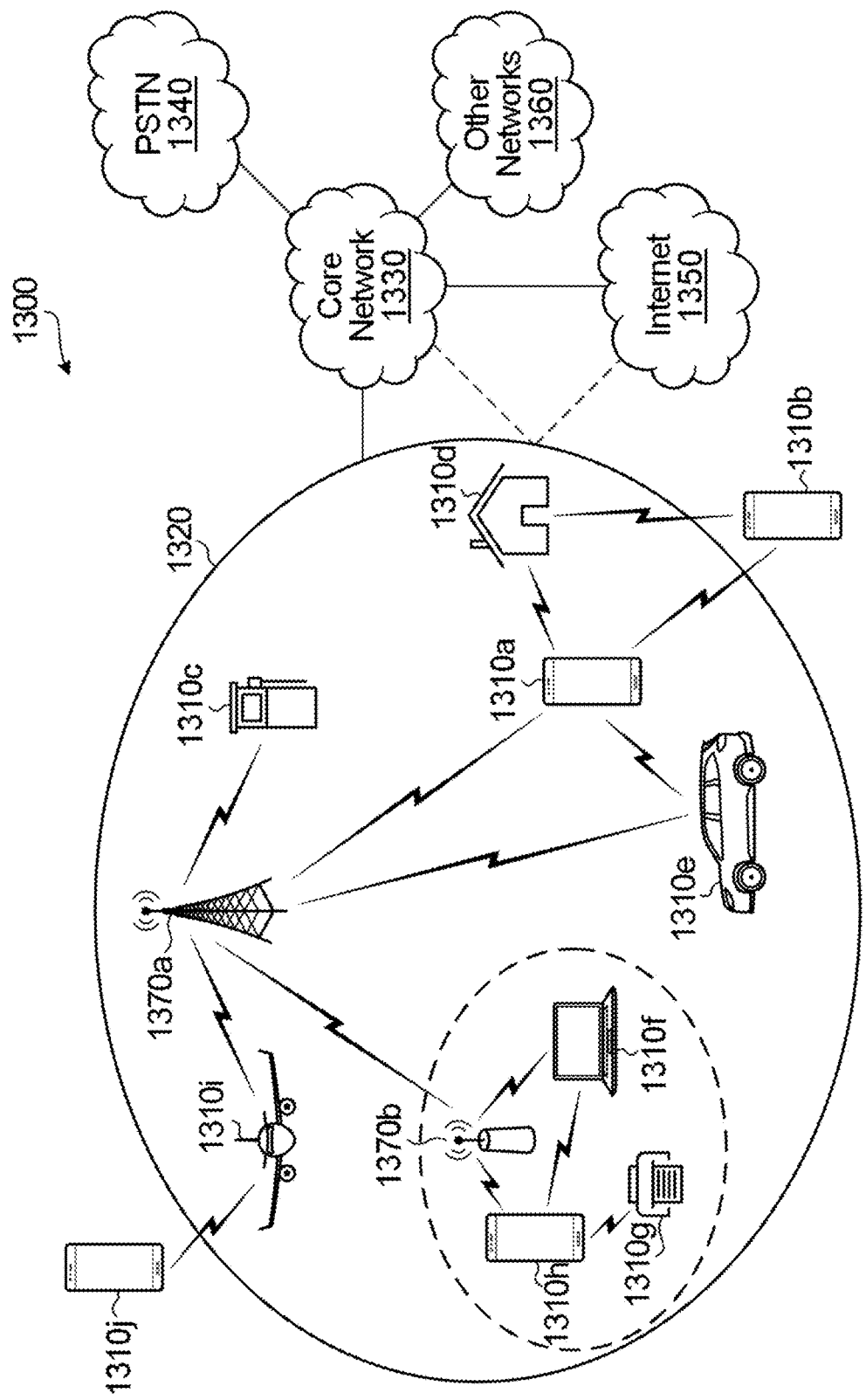
FIG. 13 is a simplified schematic illustration of a communication system.

Referring now to FIG. 13, as an illustrative example without limitation, a simplified schematic illustration of a communication system is provided. The communication system 1300 comprises a radio access network 1320. The radio access network 1320 may be a next generation (e.g. sixth generation (6G) or later) radio access network, or a legacy (e.g. 5G, 4G, 3G or 2G) radio access network. One or more communication electric device (ED) 1310a-1310j (generically referred to as 1310) may be interconnected to one another or connected to one or more network nodes (1370a, 1370b, generically referred to as 1370) in the radio access network 1320. A core network 1330 may be a part of the communication system and may be dependent or independent of the radio access technology used in the communication system 1300. Also the communication system 1300 comprises a public switched telephone network (PSTN) 1340, the internet 1350, and other networks 1360.

Figure 14:
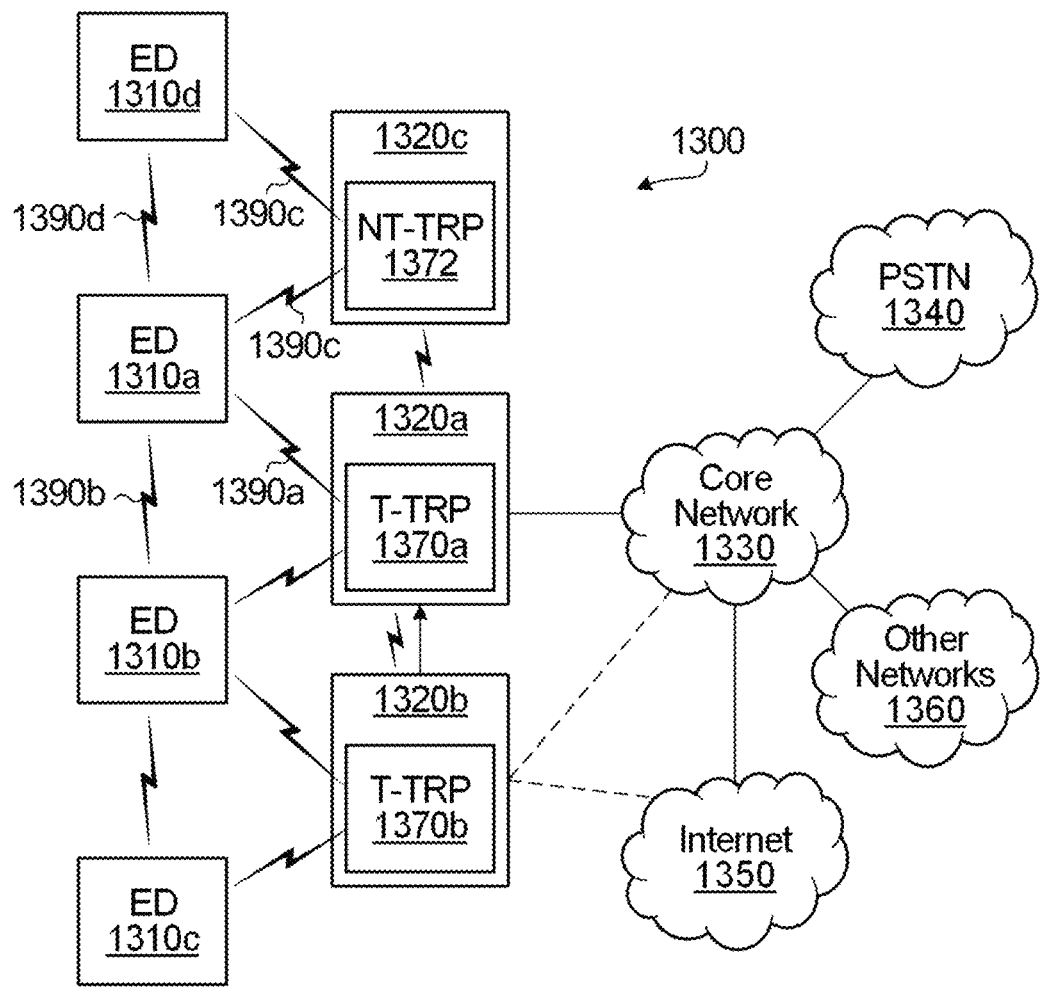
FIG. 14 illustrates an example communication system.

FIG. 14 illustrates an example communication system 1300. In general, the communication system 1300 enables multiple wireless or wired elements to communicate data and other content. The purpose of the communication system 1300 may be to provide content, such as voice, data, video, and/or text, via broadcast, multicast and unicast, etc. The communication system 1300 may operate by sharing resources, such as carrier spectrum bandwidth, between its constituent elements. The communication system 1300 may include a terrestrial communication system and/or a non-terrestrial communication system. The communication system 1300 may provide a wide range of communication services and applications (such as earth monitoring, remote sensing, passive sensing and positioning, navigation and tracking, autonomous delivery and mobility, etc.). The communication system 1300 may provide a high degree of availability and robustness through a joint operation of the terrestrial communication system and the non-terrestrial communication system. For example, integrating a non-terrestrial communication system (or components thereof) into a terrestrial communication system can result in what may be considered a heterogeneous network comprising multiple layers. Compared to conventional communication networks, the heterogeneous network may achieve better overall performance through efficient multi-link joint operation, more flexible functionality sharing, and faster physical layer link switching between terrestrial networks and non-terrestrial networks.

The terrestrial communication system and the non-terrestrial communication system could be considered sub-systems of the communication system. In the example shown, the communication system 1300 includes electronic devices (ED) 1310a-1310d (generically referred to as ED 1310), radio access networks (RANs) 1320a-1320b, non-terrestrial communication network 1320c, a core network 1330, a public switched telephone network (PSTN) 1340, the internet 1350, and other networks 1360. The RANs 1320a-1320b include respective base stations (BSs) 1370a-1370b, which may be generically referred to as terrestrial transmit and receive points (T-TRPs) 1370a-1370b. The non-terrestrial communication network 1320c includes an access node 1320c, which may be generically referred to as a non-terrestrial transmit and receive point (NT-TRP) 1372.

Any ED 1310 may be alternatively or additionally configured to interface, access, or communicate with any other T-TRP 1370a-1370b and NT-TRP 1372, the internet 1350, the core network 1330, the PSTN 1340, the other networks 1360, or any combination of the preceding. In some examples, ED 1310a may communicate an uplink and/or downlink transmission over an interface 1390a with T-TRP 1370a. In some examples, the EDs 1310a, 1310b and 1310d may also communicate directly with one another via one or more sidelink air interfaces 1390b. In some examples, ED 1310a, 1310d may communicate an uplink and/or downlink transmission over an interface 1390c with NT-TRP 1372.

The air interfaces 1390a and 1390b may use similar communication technology, such as any suitable radio access technology. For example, the communication system 1300 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the air interfaces 1390a and 1390b. The air interfaces 1390a and 1390b may utilize other higher dimension signal spaces, which may involve a combination of orthogonal and/or non-orthogonal dimensions.

The air interface 1390c can enable communication between the ED 1310a, 1310d and one or multiple NT-TRPs 1372 via a wireless link or simply a link. For some examples, the link is a dedicated connection for unicast transmission, a connection for broadcast transmission, or a connection between a group of EDs and one or multiple NT-TRPs for multicast transmission.

The RANs 1320a and 1320b are in communication with the core network 1330 to provide the EDs 1310a 1310b, and 1310c with various services such as voice, data, and other services. The RANs 1320a and 1320b and/or the core network 1330 may be in direct or indirect communication with one or more other RANs (not shown), which may or may not be directly served by core network 1330, and may or may not employ the same radio access technology as RAN 1320a, RAN 1320b or both. The core network 1330 may also serve as a gateway access between (i) the RANs 1320a and 1320b or EDs 1310a 1310b, and 1310c or both, and (ii) other networks (such as the PSTN 1340, the internet 1350, and the other networks 1360). In addition, some or all of the EDs 1310a 1310b, and 1310c may include functionality for communicating with different wireless networks over different wireless links using different wireless technologies and/or protocols. Instead of wireless communication (or in addition thereto), the EDs 1310a 1310b, and 1310c may communicate via wired communication channels to a service provider or switch (not shown), and to the internet 1350. PSTN 1340 may include circuit switched telephone networks for providing plain old telephone service (POTS). Internet 1350 may include a network of computers and subnets (intranets) or both, and incorporate protocols, such as Internet Protocol (IP), Transmission Control Protocol (TCP), User Datagram Protocol (UDP). EDs 1310a 1310b, and 1310c may be multimode devices capable of operation according to multiple radio access technologies, and incorporate multiple transceivers necessary to support such.

Figure 15:
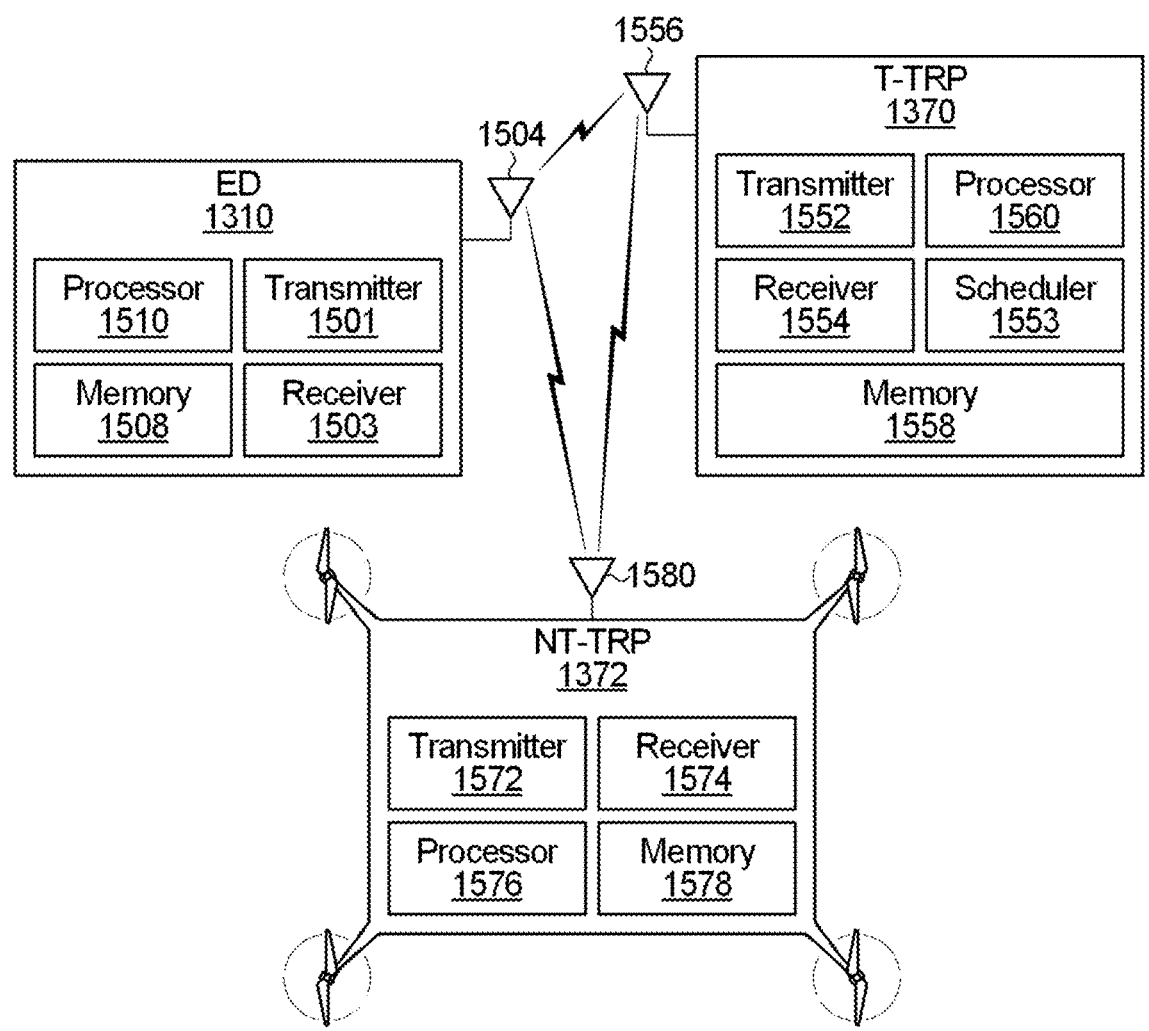
FIG. 15 illustrates an example electronic device and examples of base stations.

FIG. 15 illustrates another example of an ED 1310 and a base station 1370a, 1370b and/or 1370c. The ED 1310 is used to connect persons, objects, machines, etc. The ED 1310 may be widely used in various scenarios, for example, cellular communications, device-to-device (D2D), vehicle to everything (V2X), peer-to-peer (P2P), machine-to-machine (M2M), machine-type communications (MTC), internet of things (IOT), virtual reality (VR), augmented reality (AR), industrial control, self-driving, remote medical, smart grid, smart furniture, smart office, smart wearable, smart transportation, smart city, drones, robots, remote sensing, passive sensing, positioning, navigation and tracking, autonomous delivery and mobility, etc.

Each ED 1310 represents any suitable end user device for wireless operation and may include such devices (or may be referred to) as a user equipment/device (UE), a wireless transmit/receive unit (WTRU), a mobile station, a fixed or mobile subscriber unit, a cellular telephone, a station (STA), a machine type communication (MTC) device, a personal digital assistant (PDA), a smartphone, a laptop, a computer, a tablet, a wireless sensor, a consumer electronics device, a smart book, a vehicle, a car, a truck, a bus, a train, or an IoT device, an industrial device, or apparatus (e.g. communication module, modem, or chip) in the forgoing devices, among other possibilities. Future generation EDs 1310 may be referred to using other terms. The base station 1370a and 1370b is a T-TRP and will hereafter be referred to as T-TRP 1370. Also shown in FIG. 15, an NT-TRP will hereafter be referred to as NT-TRP 1372. Each ED 1310 connected to T-TRP 1370 and/or NT-TRP 1372 can be dynamically or semi-statically turned-on (i.e., established, activated, or enabled), turned-off (i.e., released, deactivated, or disabled) and/or configured in response to one of more of: connection availability and connection necessity.

The ED 1310 includes a transmitter 1501 and a receiver 1503 coupled to one or more antennas 1504. Only one antenna 1504 is illustrated. One, some, or all of the antennas may alternatively be panels. The transmitter 1501 and the receiver 1503 may be integrated, e.g. as a transceiver. The transceiver is configured to modulate data or other content for transmission by at least one antenna 1504 or network interface controller (NIC). The transceiver is also configured to demodulate data or other content received by the at least one antenna 1504. Each transceiver includes any suitable structure for generating signals for wireless or wired transmission and/or processing signals received wirelessly or by wire. Each antenna 1504 includes any suitable structure for transmitting and/or receiving wireless or wired signals.

The ED 1310 includes at least one memory 1508. The memory 1508 stores instructions and data used, generated, or collected by the ED 1310. For example, the memory 1508 could store software instructions or modules configured to implement some or all of the functionality and/or embodiments described herein and that are executed by the processing unit(s) 1510. Each memory 1508 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, on-processor cache, and the like.

The ED 1310 may further include one or more input/output devices (not shown) or interfaces (such as a wired interface to the internet 1350 in FIG. 13). The input/output devices permit interaction with a user or other devices in the network. Each input/output device includes any suitable structure for providing information to or receiving information from a user, such as a speaker, microphone, keypad, keyboard, display, or touch screen, including network interface communications.

The ED 1310 further includes a processor 1510 for performing operations including those related to preparing a transmission for uplink transmission to the NT-TRP 1372 and/or T-TRP 1370, those related to processing downlink transmissions received from the NT-TRP 1372 and/or T-TRP 1370, and those related to processing sidelink transmission to and from another ED 1310. Processing operations related to preparing a transmission for uplink transmission may include operations such as encoding, modulating, transmit beamforming, and generating symbols for transmission. Processing operations related to processing downlink transmissions may include operations such as receive beamforming, demodulating and decoding received symbols. Depending upon the embodiment, a downlink transmission may be received by the receiver 1503, possibly using receive beamforming, and the processor 1510 may extract signaling from the downlink transmission (e.g. by detecting and/or decoding the signaling). An example of signaling may be a reference signal transmitted by NT-TRP 1372 and/or T-TRP 1370. In some embodiments, the processor 1510 implements the transmit beamforming and/or receive beamforming based on the indication of beam direction, e.g. beam angle information (BAI), received from T-TRP 1370. In some embodiments, the processor 1510 may perform operations relating to network access (e.g. initial access) and/or downlink synchronization, such as operations relating to detecting a synchronization sequence, decoding and obtaining the system information, etc. In some embodiments, the processor 1510 may perform channel estimation, e.g. using a reference signal received from the NT-TRP 1372 and/or T-TRP 1370.

Although not illustrated, the processor 1510 may form part of the transmitter 1501 and/or receiver 1503. Although not illustrated, the memory 1508 may form part of the processor 1510.

The processor 1510, and the processing components of the transmitter 1501 and receiver 1503 may each be implemented by the same or different one or more processors that are configured to execute instructions stored in a memory (e.g. in memory 1508). Alternatively, some or all of the processor 1510, and the processing components of the transmitter 1501 and receiver 1503 may be implemented using dedicated circuitry, such as a programmed field-programmable gate array (FPGA), a graphical processing unit (GPU), or an application-specific integrated circuit (ASIC).

The T-TRP 1370 may be known by other names in some implementations, such as a base station, a base transceiver station (BTS), a radio base station, a network node, a network device, a device on the network side, a transmit/receive node, a Node B, an evolved NodeB (eNodeB or eNB), a Home eNodeB, a next Generation NodeB (gNB), a transmission point (TP), a site controller, an access point (AP), or a wireless router, a relay station, a remote radio head, a terrestrial node, a terrestrial network device, or a terrestrial base station, base band unit (BBU), remote radio unit (RRU), active antenna unit (AAU), remote radio head (RRH), central unit (CU), distribute unit (DU), positioning node, among other possibilities. The T-TRP 1370 may be macro BSs, pico BSs, relay node, donor node, or the like, or combinations thereof. The T-TRP 1370 may refer to the forging devices or apparatus (e.g. communication module, modem, or chip) in the forgoing devices.

In some embodiments, the parts of the T-TRP 1370 may be distributed. For example, some of the modules of the T-TRP 1370 may be located remote from the equipment housing the antennas of the T-TRP 1370, and may be coupled to the equipment housing the antennas over a communication link (not shown) sometimes known as front haul, such as common public radio interface (CPRI). Therefore, in some embodiments, the term T-TRP 1370 may also refer to modules on the network side that perform processing operations, such as determining the location of the ED 1310, resource allocation (scheduling), message generation, and encoding/decoding, and that are not necessarily part of the equipment housing the antennas of the T-TRP 1370. The modules may also be coupled to other T-TRPs. In some embodiments, the T-TRP 1370 may actually be a plurality of T-TRPs that are operating together to serve the ED 1310, e.g. through coordinated multipoint transmissions.

The T-TRP 1370 includes at least one transmitter 1552 and at least one receiver 1554 coupled to one or more antennas 1556. Only one antenna 1556 is illustrated. One, some, or all of the antennas may alternatively be panels. The transmitter 1552 and the receiver 1554 may be integrated as a transceiver. The T-TRP 1370 further includes a processor 1560 for performing operations including those related to: preparing a transmission for downlink transmission to the ED 1310, processing an uplink transmission received from the ED 1310, preparing a transmission for backhaul transmission to NT-TRP 1372, and processing a transmission received over backhaul from the NT-TRP 1372. Processing operations related to preparing a transmission for downlink or backhaul transmission may include operations such as encoding, modulating, precoding (e.g. multiple-input multiple-output (MIMO) precoding), transmit beamforming, and generating symbols for transmission. Processing operations related to processing received transmissions in the uplink or over backhaul may include operations such as receive beamforming, and demodulating and decoding received symbols. The processor 1560 may also perform operations relating to network access (e.g. initial access) and/or downlink synchronization, such as generating the content of synchronization signal blocks (SSBs), generating the system information, etc. In some embodiments, the processor 1560 also generates the indication of beam direction, e.g. BAI, which may be scheduled for transmission by scheduler 1553. The processor 1560 performs other network-side processing operations described herein, such as determining the location of the ED 1310, determining where to deploy NT-TRP 1372, etc. In some embodiments, the processor 1560 may generate signaling, e.g. to configure one or more parameters of the ED 1310 and/or one or more parameters of the NT-TRP 1372. Any signaling generated by the processor 1560 is sent by the transmitter 1552. Note that "signaling", as used herein, may alternatively be called control signaling. Dynamic signaling may be transmitted in a control channel, e.g. a physical downlink control channel (PDCCH), and static or semi-static higher layer signaling may be included in a packet transmitted in a data channel, e.g. in a physical downlink shared channel (PDSCH).

A scheduler 1553 may be coupled to the processor 1560. The scheduler 1553 may be included within or operated separately from the T-TRP 1370, which may schedule uplink, downlink, and/or backhaul transmissions, including issuing scheduling grants and/or configuring scheduling-free ("configured grant") resources. The T-TRP 1370 further includes a memory 1558 for storing information and data. The memory 1558 stores instructions and data used, generated, or collected by the T-TRP 1370. For example, the memory 1558 could store software instructions or modules configured to implement some or all of the functionality and/or embodiments described herein and that are executed by the processor 1560.

Although not illustrated, the processor 1560 may form part of the transmitter 1552 and/or receiver 1554. Also, although not illustrated, the processor 1560 may implement the scheduler 1553. Although not illustrated, the memory 1558 may form part of the processor 1560.

The processor 1560, the scheduler 1553, and the processing components of the transmitter 1552 and receiver 1554 may each be implemented by the same or different one or more processors that are configured to execute instructions stored in a memory, e.g. in memory 1558. Alternatively, some or all of the processor 1560, the scheduler 1553, and the processing components of the transmitter 1552 and receiver 1554 may be implemented using dedicated circuitry, such as a FPGA, a GPU, or an ASIC.

Although the NT-TRP 1372 is illustrated as a drone only as an example, the NT-TRP 1372 may be implemented in any suitable non-terrestrial form. Also, the NT-TRP 1372 may be known by other names in some implementations, such as a non-terrestrial node, a non-terrestrial network device, or a non-terrestrial base station. The NT-TRP 1372 includes a transmitter 1572 and a receiver 1574 coupled to one or more antennas 1580. Only one antenna 1580 is illustrated. One, some, or all of the antennas may alternatively be panels. The transmitter 1572 and the receiver 1574 may be integrated as a transceiver. The NT-TRP 1372 further includes a processor 1576 for performing operations including those related to: preparing a transmission for downlink transmission to the ED 1310, processing an uplink transmission received from the ED 1310, preparing a transmission for backhaul transmission to T-TRP 1370, and processing a transmission received over backhaul from the T-TRP

1370. Processing operations related to preparing a transmission for downlink or backhaul transmission may include operations such as encoding, modulating, precoding (e.g. MIMO precoding), transmit beamforming, and generating symbols for transmission. Processing operations related to processing received transmissions in the uplink or over backhaul may include operations such as receive beamforming, and demodulating and decoding received symbols. In some embodiments, the processor 1576 implements the transmit beamforming and/or receive beamforming based on beam direction information (e.g. BAI) received from T-TRP 1370. In some embodiments, the processor 1576 may generate signaling, e.g. to configure one or more parameters of the ED 1310. In some embodiments, the NT-TRP 1372 implements physical layer processing, but does not implement higher layer functions such as functions at the medium access control (MAC) or radio link control (RLC) layer. As this is only an example, more generally, the NT-TRP 1372 may implement higher layer functions in addition to physical layer processing.

The NT-TRP 1372 further includes a memory 1578 for storing information and data. Although not illustrated, the processor 1576 may form part of the transmitter 1572 and/or receiver 1574. Although not illustrated, the memory 1578 may form part of the processor 1576.

The processor 1576 and the processing components of the transmitter 1572 and receiver 1574 may each be implemented by the same or different one or more processors that are configured to execute instructions stored in a memory, e.g. in memory 1578. Alternatively, some or all of the processor 1576 and the processing components of the transmitter 1572 and receiver 1574 may be implemented using dedicated circuitry, such as a programmed FPGA, a GPU, or an ASIC. In some embodiments, the NT-TRP 1372 may actually be a plurality of NT-TRPs that are operating together to serve the ED 1310, e.g. through coordinated multipoint transmissions.

The T-TRP 1370, the NT-TRP 1372, and/or the ED 1310 may include other components, but these have been omitted for the sake of clarity.

One or more steps of the embodiment methods provided herein may be performed by corresponding units or modules, according to FIG. 16. FIG. 16 illustrates units or modules in a device, such as in ED 1310, in T-TRP 1370, or in NT-TRP 1372. For example, a signal may be transmitted by a transmitting unit or a transmitting module. For example, a signal may be transmitted by a transmitting unit or a transmitting module. A signal may be received by a receiving unit or a receiving module. A signal may be processed by a processing unit or a processing module. Other steps may be performed by an artificial intelligence (AI) or machine learning (ML) module. The respective units or modules may be implemented using hardware, one or more components or devices that execute software, or a combination thereof. For instance, one or more of the units or modules may be an integrated circuit, such as a programmed FPGA, a GPU, or an ASIC. It will be appreciated that where the modules are implemented using software for execution by a processor for example, they may be retrieved by a processor, in whole or part as needed, individually or together for processing, in single or multiple instances, and that the modules themselves may include instructions for further deployment and instantiation.

Additional details regarding the EDs 1310, T-TRP 1370, and NT-TRP 1372 are known to those of skill in the art. As such, these details are omitted here.

FIGS. 13 to 16 provide examples of communication systems and communication devices in which features disclosed herein may be implemented. Computer program product embodiments are also contemplated.

An apparatus may include a processor and a non-transitory computer readable storage medium, coupled to the processor, storing programming for execution by the processor. In FIG. 15, for example, the processors 1510, 1560, 1576 may each be or include one or more processors, and each memory 1508, 1558, 1578 is an example of a non-transitory computer readable storage medium, in an ED 1310 and a TRP 1370, 1372. A non-transitory computer readable storage medium need not necessarily be provided only in combination with a processor, and may be provided separately in a computer program product, for example.

The programming stored in or on a non-transitory computer readable storage medium may include instructions to, or to cause a processor to, communicate signaling between a first communication device and a second communication device in a wireless communication network, and to communicate a DMRS in the wireless communication network. The signaling indicates information associated with pulse shaping and information associated with a target length of a DMRS sequence, and the DMRS, which includes a DMRS sequence of the target length to which the pulse shaping has been applied, is or includes a base sequence that is determined based on the pulse shaping.

Other features disclosed herein may also or instead be implemented in apparatus embodiments or computer program product embodiments. For example, any of the following features may be provided, individually or in any of various combinations:

- the programming may include instructions to, or to cause a processor to, communicate signaling by transmitting the signaling from the first communication device to the second communication device;
- the programming may include instructions to, or to cause a processor to, communicate signaling by receiving the signaling at the first communication device from the second communication device;
- the programming may include instructions to, or to cause a processor to, communicate a DMRS by communicating the DMRS between the first communication device and the second communication device;
- the programming may include instructions to, or to cause a processor to, communicate a DMRS by communicating the DMRS between the first communication device (or the second communication device) and a third communication device in the wireless communication network;
- the information associated with pulse shaping may include, for example, any one or more of: a pulse shape type, a roll off factor $\alpha$, a bandwidth expansion, a bandwidth expansion factor $\beta$, a base sequence length parameter such as q* or K that is based on the pulse shaping, and a length of the base sequence;
- the pulse shape type is RC or RRC, the pulse shaping is based on RC or RRC pulses, and $\beta=1+\alpha$;
- a length N of a base sequence may be a prime number that is closest to q*M (or K), a largest prime number such that N≤q*M (or K), or a smallest prime number such that N≥q*M (or K), where q* is a base sequence length parameter that is based on the pulse shaping and M is a target length of a DMRS sequence for the DMRS;
- q* is within a range $0.5 \leq q^* \leq 1$;
- the base sequence is or includes a ZC sequence $x_s(n)$ of length $N=N_{zc}$:

$$x_s(n) = e^{\frac{j\pi sn(n+1)}{N_{zc}}}, \quad 0 \le n \le N_{zc} - 1;$$

- the information associated with pulse shaping is or includes q*;
- signaling may also or instead indicate other information that is associated with pulse shaping;
- if signaling indicates q*, then q* is obtained from the received signaling;
- q* may be obtained based on the information that is associated with pulse shaping and indicated in the signaling;
- in embodiments in which the programming includes instructions to, or to cause a processor to, communicate the DMRS by transmitting the DMRS, the programming may further include instructions to, or to cause a processor to, obtain q* based on the information associated with pulse shaping;
- in embodiments in which the programming includes instructions to, or to cause a processor to, communicate the DMRS by receiving the DMRS, the programming may further include instructions to, or to cause a processor to, generate a local or receiver version of the DMRS for channel estimation, by obtaining q* based on the information associated with pulse shaping;
- obtaining q* may involve a mapping between the information associated with pulse shaping (indicated in the signaling) and preferred or optimal values of q*;
- values of q* may be mapped to the information associated with pulse shaping in a table or other record stored in a memory (the non-transitory computer-readable storage medium in which the programming is stored, or another memory) or otherwise accessible for obtaining an value of q*;
- a table or other record may include multiple preferred or optimal values of q*, for a plurality of different pulse shaping options, with a respective value of q* for each different pulse shaping option;
- a value of q* may be chosen, selected, or otherwise obtained based on the information associated with pulse shaping (indicated in the signaling);
- a DMRS may include a base sequence extended to a target length of a DMRS sequence for the DMRS by cyclic repetition;
- for a DMRS transmitter, the programming includes instructions to, or to cause a processor to, communicate the DMRS by transmitting the DMRS, and the programming may further include instructions to, or to cause a processor to, extend the base sequence to the target length of the DMRS sequence by cyclic repetition;
- for a DMRS receiver or intended receiver, the programming includes instructions to, or to cause a processor to, communicate the DMRS by receiving the DMRS, and the programming may further include instructions to, or to cause a processor to, generate a receiver version of the DMRS for channel estimation by extending the base sequence to the target length of the DMRS sequence by cyclic repetition to generate the receiver version of the DMRS sequence;
- as an example of extending a sequence, a DMRS may include the base sequence extended to target length M=$M_{zc}$ of the DMRS sequence by cyclic repetition to generate the DMRS sequence $r_s(m)=x_s(m \bmod N_{zc})$;
- for a DMRS transmitter, the programming includes instructions to, or to cause a processor to, communicate the DMRS by transmitting the DMRS, and the programming may further include instructions to, or to cause a processor to, extend the base sequence to the target length M=$M_{zc}$ of the DMRS sequence by cyclic repetition to generate this DMRS sequence;
- for a DMRS receiver or intended receiver, the programming includes instructions to, or to cause a processor to, communicate the DMRS by receiving the DMRS, and the programming may include instructions to, or to cause a processor to, generate the receiver version of the DMRS for channel estimation by extending the base sequence to the target length M=$M_{zc}$ of the DMRS sequence by cyclic repetition to generate the receiver version of the DMRS sequence $r_s(m)=x_s(m \bmod N_{zc})$;
- the DMRS is or includes a pulse-shaped DMRS sequence;
- the pulse-shaped DMRS sequence may be or include the DMRS sequence, to which the pulse shaping is applied;
- for a DMRS transmitter, the programming may include instructions to, or to cause a processor to, apply the pulse shaping to the DMRS sequence to generate the pulse-shaped DMRS sequence;
- for a DMRS receiver or intended receiver, the receiver version of the DMRS may be or include a receiver version of the pulse-shaped DMRS sequence, and the programming may include instructions to, or to cause a processor to, generate the receiver version of the pulse-shaped DMRS sequence by applying the pulse shaping to the receiver version of the DMRS sequence;
- pulse shape length of a pulse for the pulse shaping may be $M_{zc}$, coefficients of the pulse for the pulse shaping are $f(0), \ldots, f(M_{zc}-1)$, and the DMRS is $\tilde{r}_s(0), \tilde{r}_s(1), \ldots, \tilde{r}_s(M_{zc})$, with $\tilde{r}_s(m)=f(m)r_s(m)$, $0 \le m \le M_{zc}-1$;
- for a DMRS transmitter, the programming may include instructions to, or to cause a processor to, apply such pulse shaping to the DMRS sequence to generate the pulse-shaped DMRS sequence;
- for a DMRS receiver or intended receiver, the programming may include instructions to, or to cause a processor to, apply such pulse shaping to the receiver version of the DMRS sequence to generate the receiver version of the pulse-shaped DMRS sequence;
- the programming may include instructions to, or to cause a processor to, communicate the DMRS by communicating (transmitting or receiving), a precoded pulse-shaped DMRS sequence;
- the precoded pulse-shaped DMRS sequence may be or include the pulse-shaped DMRS sequence to which precoding is applied;
- the precoding may involve CDM;
- the programming may include instructions to, or to cause a processor to, communicate the DMRS by communicating frequency domain components of the DMRS mapped to subcarriers and converted to time domain;
- the programming may include instructions to, or to cause a processor to, communicate the DMRS with a cyclic prefix inserted;
- the programming may include instructions to, or to cause a processor to, perform any one or more of precoding, subcarrier mapping, converting from frequency domain to time domain, and cyclic prefix insertion at a DMRS transmitter;
- the programming may include instructions to, or to cause a processor to, perform any one or more of counterpart or inverse operations including cyclic prefix removal, converting from time domain to frequency domain, subcarrier demapping, and decoding.

Other features, including those disclosed herein in the context of method embodiments, may also or instead be implemented in apparatus or computer program product embodiments. For example, various "communicating" permutations described above in the context of method embodiments may be applied in apparatus or computer program product embodiments.

Embodiments disclosed herein may provide low PAPR DMRSs for different roll off factors or bandwidth expansions, with good channel estimation performance and little or no BLER performance loss. Embodiments may also provide the ability to implement CDM in frequency domain, for potentially higher multiplexing gain.

Some embodiments relate to structure of a DMRS that involves using a specified or otherwise obtained parameter $q^*$, which is based on pulse shape, to generate a sequence, such as a ZC sequence. Cyclic repetition of the sequence may be used to extend the sequence to a target length, and pulse shaping such as FDSS pulse shaping is applied to the extended (and optionally CDM precoded) sequence.

Parameters or characteristics such as reference signal structure, generation of a base sequence using $q^*$, cyclic repetition of the base sequence, and/or pulse shape details may be defined in communication standards or specifications. Signaling indicative of any of various types of information, such as base sequence length, pulse shape, or other information based upon which base sequence length may be determined or obtained or a reference signal may be generated, may be used in reference signal configuration by higher layers, for example.

Illustrative embodiments disclosed herein relate primarily to DMRSs. The same or similar embodiments may also or instead apply to other types of reference signals for channel estimation.

What has been described is merely illustrative of the application of principles of embodiments of the present disclosure. Other arrangements and methods can be implemented by those skilled in the art.

For example, although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment could be combined with selected features of other example embodiments.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

Although aspects of the present invention have been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although embodiments and potential advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

In addition, although described primarily in the context of methods and apparatus, other implementations are also contemplated, as instructions stored on a non-transitory computer-readable medium, for example. Such media could store programming or instructions to perform any of various methods consistent with the present disclosure.

Moreover, any module, component, or device exemplified herein that executes instructions may include or otherwise have access to a non-transitory computer readable or processor readable storage medium or media for storage of information, such as computer readable or processor readable instructions, data structures, program modules, and/or other data. A non-exhaustive list of examples of non-transitory computer readable or processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and nonremovable media implemented in any method or technology, random-access memory (RAM), read-only memory (ROM), electrically erasable programmable read-only memory (EEPROM), flash memory or other memory technology. Any such non-transitory computer readable or processor readable storage media may be part of a device or accessible or connectable thereto. Any application or module herein described may be implemented using instructions that are readable and executable by a computer or processor may be stored or otherwise held by such non-transitory computer readable or processor readable storage media.

What is claimed is:

1. A method comprising:
communicating signaling between a first communication device and a second communication device in a wireless communication network, the signaling indicating information associated with pulse shaping and information associated with a target length of a demodulation reference signal (DMRS) sequence; and
communicating a DMRS in the wireless communication network, the DMRS comprising a DMRS sequence of the target length to which the pulse shaping has been applied, and the DMRS sequence comprising a base sequence that is determined based on the pulse shaping.

2. The method of claim 1, wherein communicating the signaling comprises transmitting the signaling from the first communication device to the second communication device.

3. The method of claim 1, wherein communicating the signaling comprises receiving the signaling at the first communication device from the second communication device.

4. The method of claim 1, wherein communicating the DMRS comprises communicating the DMRS between the first communication device and the second communication device.

5. The method of claim 1, wherein communicating the DMRS comprises communicating the DMRS between the first communication device and a third communication device in the wireless communication network.

6. The method of claim 1, wherein the information associated with pulse shaping comprises any one or more of: a pulse shape type, a roll off factor $\alpha$, a bandwidth expansion, a bandwidth expansion factor $\beta$, a base sequence length parameter that is based on the pulse shaping, or a length of the base sequence.

7. The method of claim 6, wherein the pulse shape type is raised cosine or root raised cosine, the pulse shaping is based on raised cosine or root raised cosine pulses, and $\beta=1+\alpha$.

8. The method of claim 1, wherein a length N of the base sequence is a prime number that is closest to q*M, a largest prime number such that N≤q*M, or a smallest prime number such that N≥q*M, and wherein q* is a base sequence length parameter that is based on the pulse shaping and M is the target length of the DMRS sequence.

9. The method of claim 1, wherein the DMRS comprises the base sequence extended to the target length of the DMRS sequence by cyclic repetition.

10. An apparatus comprising:
a processor; and
a non-transitory computer readable storage medium, coupled to the processor, storing programming for execution by the processor, the programming including instructions to:
communicate signaling between a first communication device and a second communication device in a wireless communication network, the signaling indicating information associated with pulse shaping and information associated with a target length of a demodulation reference signal (DMRS) sequence; and
communicate a DMRS in the wireless communication network, the DMRS comprising a DMRS sequence of the target length to which the pulse shaping has been applied, and the DMRS sequence comprising a base sequence that is determined based on the pulse shaping.

11. The apparatus of claim 10, the programming including instructions to communicate the signaling by transmitting the signaling from the first communication device to the second communication device.

12. The apparatus of claim 10, the programming including instructions to communicate the signaling by receiving the signaling at the first communication device from the second communication device.

13. The apparatus of claim 10, the programming including instructions to communicate the DMRS by communicating the DMRS between the first communication device and the second communication device.

14. The apparatus of claim 10, the programming including instructions to communicate the DMRS by communicating the DMRS between the first communication device and a third communication device in the wireless communication network.

15. The apparatus of claim 10, wherein the information associated with pulse shaping comprises any one or more of: a pulse shape type, a roll off factor $\alpha$, a bandwidth expansion, a bandwidth expansion factor $\beta$, a base sequence length parameter that is based on the pulse shaping, or a length of the base sequence.

16. The apparatus of claim 15, wherein the pulse shape type is raised cosine or root raised cosine, the pulse shaping is based on raised cosine or root raised cosine pulses, and $\beta=1+\alpha$.

17. The apparatus of claim 10, wherein a length N of the base sequence is a prime number that is closest to q*M, a largest prime number such that N≤q*M, or a smallest prime number such that N≥q*M, and wherein q* is a base sequence length parameter that is based on the pulse shaping and M is the target length of the DMRS sequence.

18. The apparatus of claim 10, wherein the DMRS comprises the base sequence extended to the target length of the DMRS sequence by cyclic repetition.

19. A non-transitory computer readable medium storing programming that is executable by at least one processor, the programming including instructions to:
communicate signaling between a first communication device and a second communication device in a wireless communication network, the signaling indicating information associated with pulse shaping and information associated with a target length of a demodulation reference signal (DMRS) sequence; and
communicate a DMRS in the wireless communication network, the DMRS comprising a DMRS sequence of the target length to which the pulse shaping has been applied, the DMRS sequence comprising a base sequence that is determined based on the pulse shaping.

* * * * *